(12) United States Patent
Chen et al.

(10) Patent No.: US 11,868,539 B2
(45) Date of Patent: *Jan. 9, 2024

(54) DISPLAY CONTROL METHOD AND APPARATUS

(71) Applicant: HUAWEI TECHNOLOGIES CO., LTD., Guangdong (CN)

(72) Inventors: Hao Chen, Shenzhen (CN); Qing Wang, Shenzhen (CN); Xiaoxiao Chen, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/153,592

(22) Filed: Jan. 12, 2023

(65) Prior Publication Data
US 2023/0161420 A1 May 25, 2023

Related U.S. Application Data

(63) Continuation of application No. 17/500,609, filed on Oct. 13, 2021, now Pat. No. 11,586,293, which is a (Continued)

(51) Int. Cl.
G06F 3/01 (2006.01)
G09G 5/14 (2006.01)
H04M 1/02 (2006.01)

(52) U.S. Cl.
CPC .............. *G06F 3/017* (2013.01); *G09G 5/14* (2013.01); *H04M 1/0268* (2013.01);
(Continued)

(58) Field of Classification Search
CPC ............. G09G 5/14; G09G 2340/0464; G09G 2354/00; G09G 2380/02
See application file for complete search history.

(56) References Cited

U.S. PATENT DOCUMENTS 8,648,825 B2 2/2014 Sirpal et al.
9,001,149 B2 * 4/2015 Sirpal ................... G06F 1/1647
345/619
(Continued)

FOREIGN PATENT DOCUMENTS

CN 101566865 A 10/2009
CN 201655050 U 11/2010
(Continued)

*Primary Examiner* — Dmitriy Bolotin
(74) *Attorney, Agent, or Firm* — HUAWEI TECHNOLOGIES CO., LTD.

(57) ABSTRACT

A display control method includes: obtaining, by a terminal, orientations and display statuses of a first screen and a second screen; determining, by the terminal, whether a trigger event used for adjusting the display statuses of the first screen and the second screen occurs; and when the trigger event occurs, displaying, by the terminal, adjusted display content on the first screen and the second screen based on the orientations and the display statuses of the first screen and the second screen. By obtaining an orientation and a display status of a terminal screen, when the trigger event occurs, the terminal can adjust the display status of the screen in a timely manner, so that a user can perform an interaction operation and interaction display between different screens.

18 Claims, 23 Drawing Sheets

Related U.S. Application Data continuation of application No. 16/606,668, filed as application No. PCT/CN2017/081174 on Apr. 20, 2017, now Pat. No. 11,170,737.

(52) U.S. Cl.
CPC . *G09G 2340/0464* (2013.01); *G09G 2354/00* (2013.01); *G09G 2380/02* (2013.01)

(56) References Cited

U.S. PATENT DOCUMENTS

| | | | |
|---|---|---|---|
| 9,489,078 B2 | 11/2016 | Seo et al. | |
| 9,746,883 B2* | 8/2017 | Lee | G06F 3/1431 |
| 11,170,737 B2* | 11/2021 | Chen | G06F 3/0346 |
| 11,586,293 B2* | 2/2023 | Chen | G06F 3/0346 |
| 2010/0066643 A1 | 3/2010 | King et al. | |
| 2010/0085274 A1* | 4/2010 | Kilpatrick | G06F 1/1641 |
| | | | 345/1.3 |
| 2010/0182265 A1* | 7/2010 | Kim | G06F 1/1641 |
| | | | 345/1.3 |
| 2010/0289763 A1 | 11/2010 | Liao et al. | |
| 2011/0187662 A1* | 8/2011 | Lee | G06F 1/1616 |
| | | | 345/1.3 |
| 2011/0216064 A1* | 9/2011 | Dahl | H04M 1/0247 |
| | | | 345/428 |
| 2012/0081277 A1* | 4/2012 | de Paz | G06F 3/04817 |
| | | | 345/156 |
| 2012/0081289 A1* | 4/2012 | Sirpal | G06F 3/04842 |
| | | | 345/168 |
| 2012/0083319 A1* | 4/2012 | Sirpal | G06F 3/04817 |
| | | | 455/566 |
| 2012/0084699 A1* | 4/2012 | Sirpal | G06F 3/04817 |
| | | | 715/773 |
| 2013/0005469 A1* | 1/2013 | Selim | A63F 13/2145 |
| | | | 463/37 |
| 2013/0129310 A1* | 5/2013 | Shustorovich | H04N 5/775 |
| | | | 386/230 |
| 2013/0321340 A1* | 12/2013 | Seo | G06F 1/1647 |
| | | | 345/174 |
| 2016/0162241 A1 | 6/2016 | An et al. | |
| 2017/0255320 A1* | 9/2017 | Kumar | G06F 3/04883 |
| 2020/0175945 A1* | 6/2020 | Chen | H04M 1/72403 |
| 2022/0190319 A1* | 6/2022 | Narita | H01M 10/0525 |

FOREIGN PATENT DOCUMENTS

| | | |
|---|---|---|
| CN | 102150126 A | 8/2011 |
| CN | 102957801 A | 3/2013 |
| CN | 103270505 A | 8/2013 |
| CN | 106453941 A | 2/2017 |
| EP | 2622433 B1 | 4/2018 |
| JP | 2007124667 A | 5/2007 |
| JP | 2008541183 A | 11/2008 |
| JP | 2012508405 A | 4/2012 |
| JP | 2012203611 A | 10/2012 |
| JP | 2013541100 A | 11/2013 |
| JP | 2013545168 A | 12/2013 |
| JP | 2014511524 A | 5/2014 |
| JP | 2015233198 A | 12/2015 |
| JP | 2020518054 A | 6/2020 |
| KR | 20100070190 A | 6/2010 |
| KR | 20140046345 A | 4/2014 |
| WO | 2008117456 A1 | 10/2008 |
| WO | 2016151426 A1 | 9/2016 |

* cited by examiner

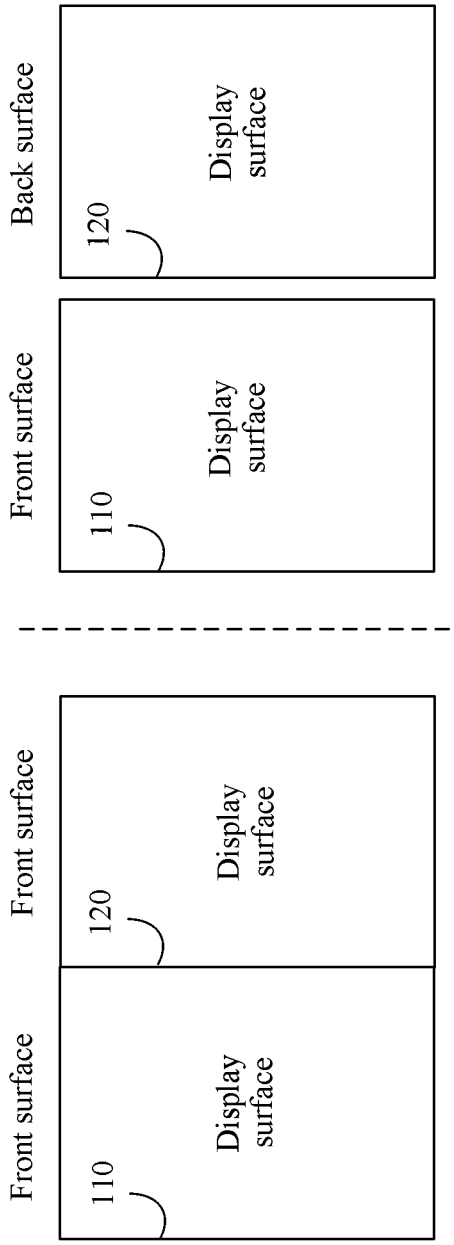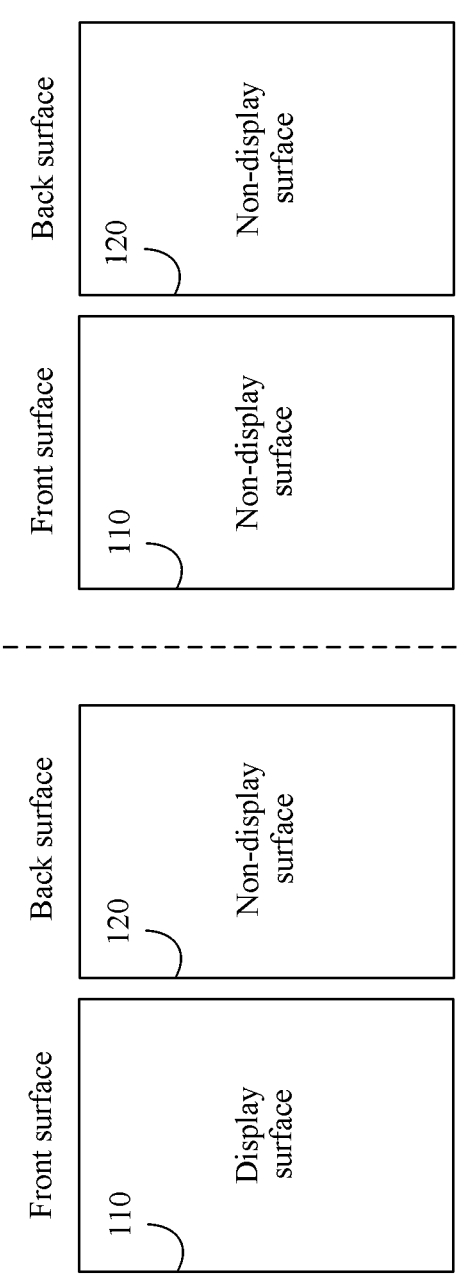

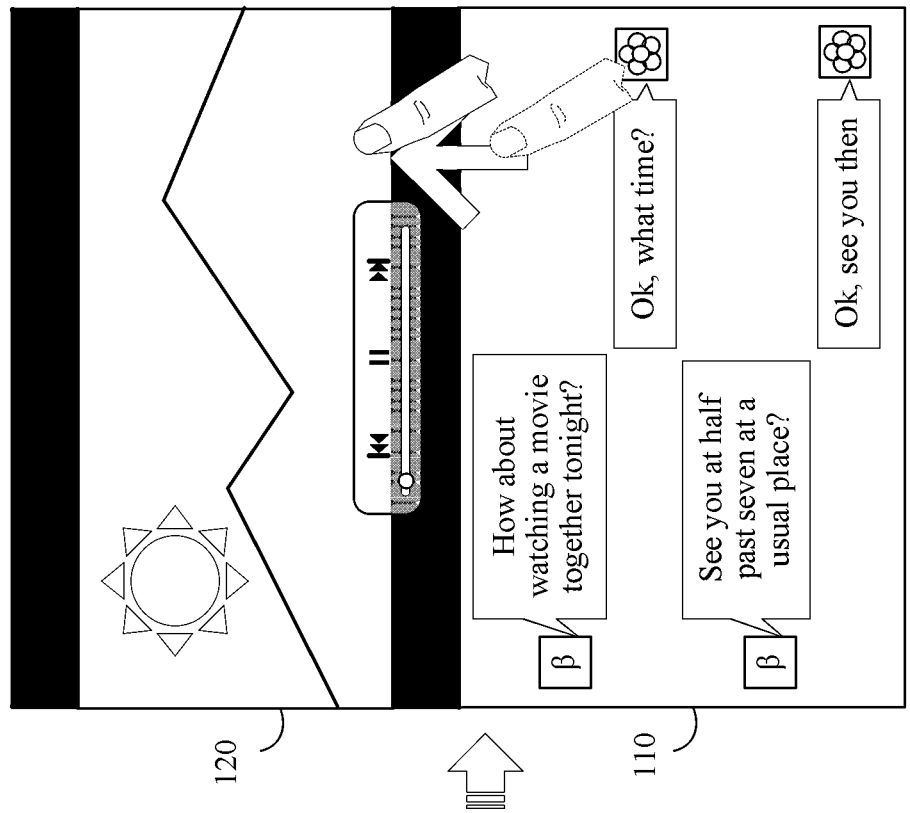
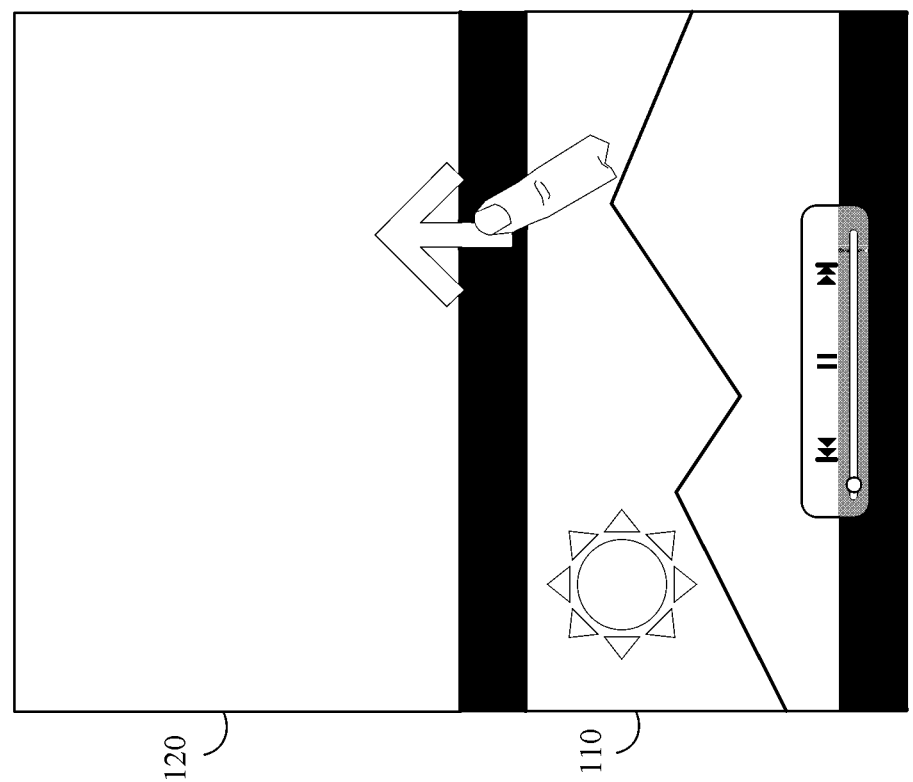
FIG. 8(A)
FIG. 8(B)

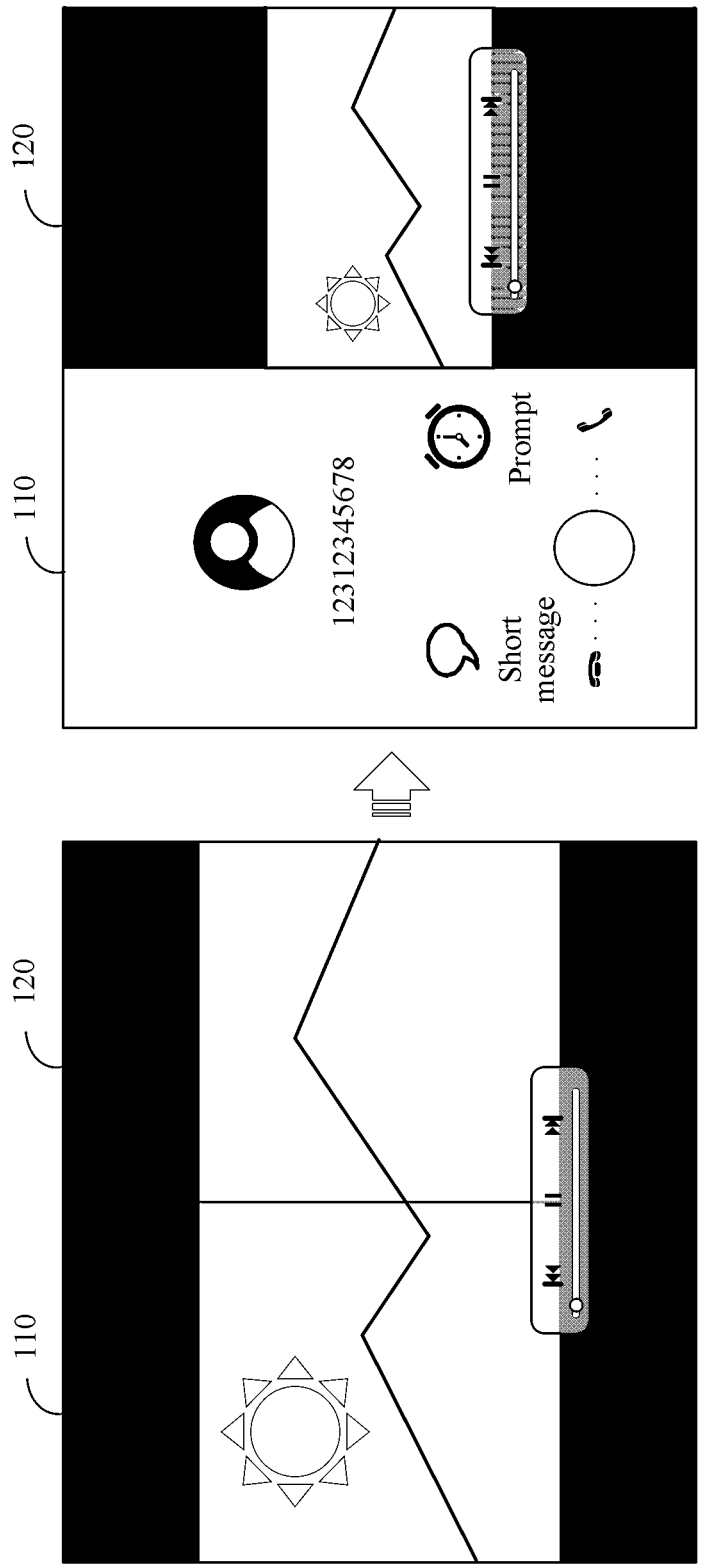

| | 110 | | 120 |
|---|---|---|---|
| ☰ Display | | ← Wallpaper | |
| Personalized settings | | Wallpaper | > |
| Wallpaper | > | Randomly change home screen wallpaper | ⊙ |
| Display mode | Large> | | |
| Text size | Large> | | |
| Text style | Default> | | |
| Text style | On> | | |
| Screen | | | |
| Eye comfort<br>Eye comfort mode filters out blue light to relieve visual fatigue | On> | | |
| Brightness | > | | |
| Color temperature<br>Unadjustable in eye comfort mode | > | | |
| Sleep<br>Screen turns off after inactivity | After 10 minutes of inactivity > | | |

CONT. FROM FIG. 16A

FIG. 16B

DISPLAY CONTROL METHOD AND APPARATUS

CROSS-REFERENCE TO RELATED APPLICATIONS

This application is a continuation of U.S. patent application Ser. No. 17/500,609, filed on Oct. 13, 2021, which is a continuation of U.S. patent application Ser. No. 16/606,668, filed on Oct. 18, 2019, now U.S. Pat. No. 11,170,737, which is a National Stage of International Patent Application No. PCT/CN2017/081174, filed on Apr. 20, 2017. All of the aforementioned patent applications are hereby incorporated by reference in their entireties.

TECHNICAL FIELD

This application relates to the field of display technologies, and in particular, to a multi-screen terminal display control method and an apparatus.

BACKGROUND

Currently, a smartphone and another electronic device tend to use a multi-screen. Moreover, electronic devices have increasingly rich screen types. In addition to a conventional display screen, a foldable screen, a curved screen, and a flexible screen appear. There are already some dual-screen flip phones on the market, for example, a flip phone with display screens respectively on a front surface and a back surface of a flip. To perform an interaction operation and interaction display between different screens and improve user experience, a display control method applicable to a multi-screen terminal is required.

SUMMARY

Embodiments of the present invention provide a multi-screen terminal display control method and an apparatus, to resolve the foregoing technical problem in the prior art.

According to a first aspect, a display control method is provided. The method is applied to a terminal that includes at least a first screen and a second screen, and the method includes: obtaining, by the terminal, orientations and display statuses of the first screen and the second screen; and when a trigger event occurs, displaying, by the terminal, adjusted display content on the first screen and the second screen based on the orientations and the display statuses of the first screen and the second screen, where the trigger event is used to trigger the terminal to adjust the display statuses of the first screen and the second screen. By obtaining an orientation and a display status of a terminal screen, when the trigger event occurs, the terminal can adjust the display status of the screen in a timely manner, so that a user can perform an interaction operation and interaction display between different screens.

In one embodiment, the obtaining, by the terminal, orientations of the first screen and the second screen of the terminal includes: obtaining, by the terminal, a relative position status of the first screen and the second screen. Therefore, the terminal can determine the relative position status and postures of the screens, and a screen being used by the user.

In one embodiment, the relative position status includes a first position status and a second position status; in the first position status, the first screen and the second screen are side by side, and face a same direction; and in the second position status, the first screen and the second screen are stacked back to back. Therefore, the terminal can be used in two different relative position statuses, and can be switched between the relative position statuses.

In one embodiment, the obtaining, by the terminal, orientations of the first screen and the second screen of the terminal includes: obtaining, by the terminal, the relative position status by using sensors disposed on the first screen and the second screen. Therefore, the terminal can obtain the relative position status of the first screen and the second screen.

In one embodiment, the sensor includes a gravity sensor, an optical proximity sensor, or a combination of a gravity sensor and an optical proximity sensor. Therefore, the terminal can obtain the relative position status of the first screen and the second screen in a plurality of manners.

In one embodiment, the display statuses of the first screen and the second screen include on/off states and display content of the first screen and the second screen.

In one embodiment, the trigger event includes at least one of the following events: orientation changes of the first screen and the second screen; a preset user operation; and a preset application activity. By using the trigger event, the terminal can make a response in a timely manner, and adjust the display status and display content of the screen.

In one embodiment, the preset user operation includes at least one of the following manners: an operation performed in a preset area and an operation performed by using a preset gesture. Therefore, the terminal can respond to the preset user operation, and adjust the display status and the display content of the screen.

In one embodiment, the first screen or the second screen is a display screen or a partial display area of the display screen.

In one embodiment, the display screen includes a flexible display screen.

According to a second aspect, a terminal is provided. The terminal includes at least a first screen and a second screen, and the terminal further includes: an obtaining module, configured to obtain orientations and display statuses of the first screen and the second screen; and a display module, configured to: when a trigger event occurs, display adjusted display content on the first screen and the second screen based on the orientations and the display statuses of the first screen and the second screen, where the trigger event is used to trigger the terminal to adjust the display statuses of the first screen and the second screen. By obtaining an orientation and a display status of a terminal screen, when the trigger event occurs, the terminal can adjust the display status of the screen in a timely manner, so that a user can perform an interaction operation and interaction display between different screens.

In one embodiment, the obtaining module is further configured to obtain a relative position status of the first screen and the second screen. Therefore, the terminal can determine the relative position status and postures of the screens, and a screen being used by the user.

In one embodiment, the relative position status includes a first position status and a second position status; in the first position status, the first screen and the second screen are side by side, and face a same direction; and in the second position status, the first screen and the second screen are stacked back to back. Therefore, the terminal can be used in two different relative position statuses, and can be switched between the relative position statuses.

In one embodiment, the obtaining module is further configured to obtain the relative position status by using sensors disposed on the first screen and the second screen. Therefore, the terminal can obtain the relative position status of the first screen and the second screen.

In one embodiment, the sensor includes a gravity sensor, an optical proximity sensor, or a combination of a gravity sensor and an optical proximity sensor. Therefore, the terminal can obtain the relative position status of the first screen and the second screen in a plurality of manners.

In one embodiment, the display statuses of the first screen and the second screen include on/off states and display content of the first screen and the second screen.

In one embodiment, the trigger event includes at least one of the following events: orientation changes of the first screen and the second screen; a preset user operation; and a preset application activity. By using the trigger event, the terminal can make a response in a timely manner, and adjust the display status and display content of the screen.

In one embodiment, the preset user operation includes at least one of the following manners: an operation performed in a preset area and an operation performed by using a preset gesture. Therefore, the terminal can respond to the preset user operation, and adjust the display status and the display content of the screen.

In one embodiment, the first screen or the second screen is a display screen or a partial display area of the display screen.

In one embodiment, the display screen includes a flexible display screen.

According to a third aspect, a terminal is provided. The terminal includes a processor, a memory, at least a first screen and a second screen, and a sensor; and the processor is configured to: obtain orientations and display statuses of the first screen and the second screen; and when a trigger event occurs, display adjusted display content on the first screen and the second screen based on the orientations and the display statuses of the first screen and the second screen, where the trigger event is used to trigger the terminal to adjust the display statuses of the first screen and the second screen. By obtaining an orientation and a display status of a terminal screen, when the trigger event occurs, the terminal can adjust the display status of the screen in a timely manner, so that a user can perform an interaction operation and interaction display between different screens.

In one embodiment, the processor is further configured to obtain a relative position status of the first screen and the second screen. Therefore, the terminal can determine the relative position status and postures of the screens, and a screen being used by the user.

In one embodiment, the relative position status includes a first position status and a second position status; in the first position status, the first screen and the second screen are side by side, and face a same direction; and in the second position status, the first screen and the second screen are stacked back to back. Therefore, the terminal can be used in two different relative position statuses, and can be switched between the relative position statuses.

In one embodiment, the processor is further configured to obtain the relative position status by using sensors disposed on the first screen and the second screen. Therefore, the terminal can obtain the relative position status of the first screen and the second screen.

In one embodiment, the sensor includes a gravity sensor, an optical proximity sensor, or a combination of a gravity sensor and an optical proximity sensor. Therefore, the terminal can obtain the relative position status of the first screen and the second screen in a plurality of manners.

In one embodiment, the display statuses of the first screen and the second screen include on/off states and display content of the first screen and the second screen.

In one embodiment, the trigger event includes at least one of the following events: orientation changes of the first screen and the second screen; a preset user operation; and a preset application activity. By using the trigger event, the terminal can make a response in a timely manner, and adjust the display status and display content of the screen.

In one embodiment, the preset user operation includes at least one of the following manners: an operation in a preset area and an operation of a preset gesture. Therefore, the terminal can respond to the preset user operation, and adjust the display status and the display content of the screen.

In one embodiment, the first screen or the second screen is a display screen or a partial display area of the display screen.

In one embodiment, the display screen includes a flexible display screen.

According to a fourth aspect, a computer-readable storage medium is provided, including an instruction. When running on a computer, the instruction enables the computer to perform the method according to the first aspect.

According to a fifth aspect, a computer program product that includes an instruction is provided. When running on a computer, the instruction enables the computer to perform the method according to the first aspect.

According to the technical solutions provided in the embodiments of the present invention, when the trigger event used for adjusting the orientation, the display status, and the display content of the screen occurs, the terminal can adjust the display status and the display content in a timely manner based on the orientation, the display status, and the display content of the screen, so that the user can perform the interaction operation and the interaction display between different screens, thereby improving user experience.

BRIEF DESCRIPTION OF DRAWINGS

To describe embodiments of the present invention more clearly, the following briefly describes the accompanying drawings required for describing the embodiments. Apparently, the accompanying drawings in the following description show merely some embodiments of the present invention, and a person of ordinary skill in the art may still derive another drawing from these accompanying drawings without creative efforts.

FIG. 3(A), FIG. 3(B), FIG. 3(C), and FIG. 3(D) are schematic diagrams of a relative position status of terminal screens according to an embodiment of the present invention;

FIG. 8(A) and FIG. 8(B) are schematic diagrams of a second display solution in a first scenario according to an embodiment of the present invention;

FIG. 9(A) and FIG. 9(B) are schematic diagrams of a third display solution in a first scenario according to an embodiment of the present invention;

FIG. 16A and FIG. 16B are a schematic diagram of a third display solution in a third scenario according to an embodiment of the present invention;

DESCRIPTION OF EMBODIMENTS

The embodiments of the present invention are described below with reference to the accompanying drawings.

For clarity, the following terms are defined.

When a "screen" is mentioned in the embodiments of the present invention, unless otherwise specified, the "screen" may represent all display areas of a display screen, or may represent a partial display area of a display screen. For example, a terminal uses a flexible display screen. The flexible display screen may be folded, and display areas can be disposed on both sides of a bending part, and separately display different content. Therefore, the flexible display screen includes at least two partial display areas on both sides of the bending part. In this case, each partial display area may be referred to as a "screen".

When a "front surface" and a "back surface" are mentioned, unless otherwise specified, the "front surface" represents a surface of the terminal facing a user, and the "back surface" represents a surface of the terminal away from the user.

When a "display surface" and a "non-display surface" are mentioned, unless otherwise specified, the "display surface" may represent a surface of a display screen that can display content or on which a user operation can be performed; and the "non-display surface" may represent a surface of the display screen that cannot display content or on which a user operation cannot be performed, and the surface is usually a rear cover or a rear housing of the display screen. In case of no ambiguity, for brevity of description, a "display surface of a screen" may also be referred to as a "screen".

The ordinal numbers such as "first" and "second" mentioned shall only serve the purpose of differentiation unless the numbers definitely indicate a sequence according to the context.

A display control method and an apparatus in the embodiments of the present invention may be applied to any terminal that has a plurality of screens and a plurality of applications. The apparatus may be hardware, software, or a combination of software and hardware that has a processing capability and that is installed on the terminal. The terminal may be a terminal such as a cell phone or a mobile phone, a tablet personal computer (TPC), a laptop computer, a digital camera, a digital camera, a projection device, a wearable device, a personal digital assistant (PDA), an e-book reader, a virtual reality intelligent device, a digital broadcast terminal, a message transceiver, a game console, a medical device, a fitness device, or a scanner. The terminal may communicate with a network through 2G, 3G, 4G, 5G, or a wireless local area network (WLAN).

Figure 1:
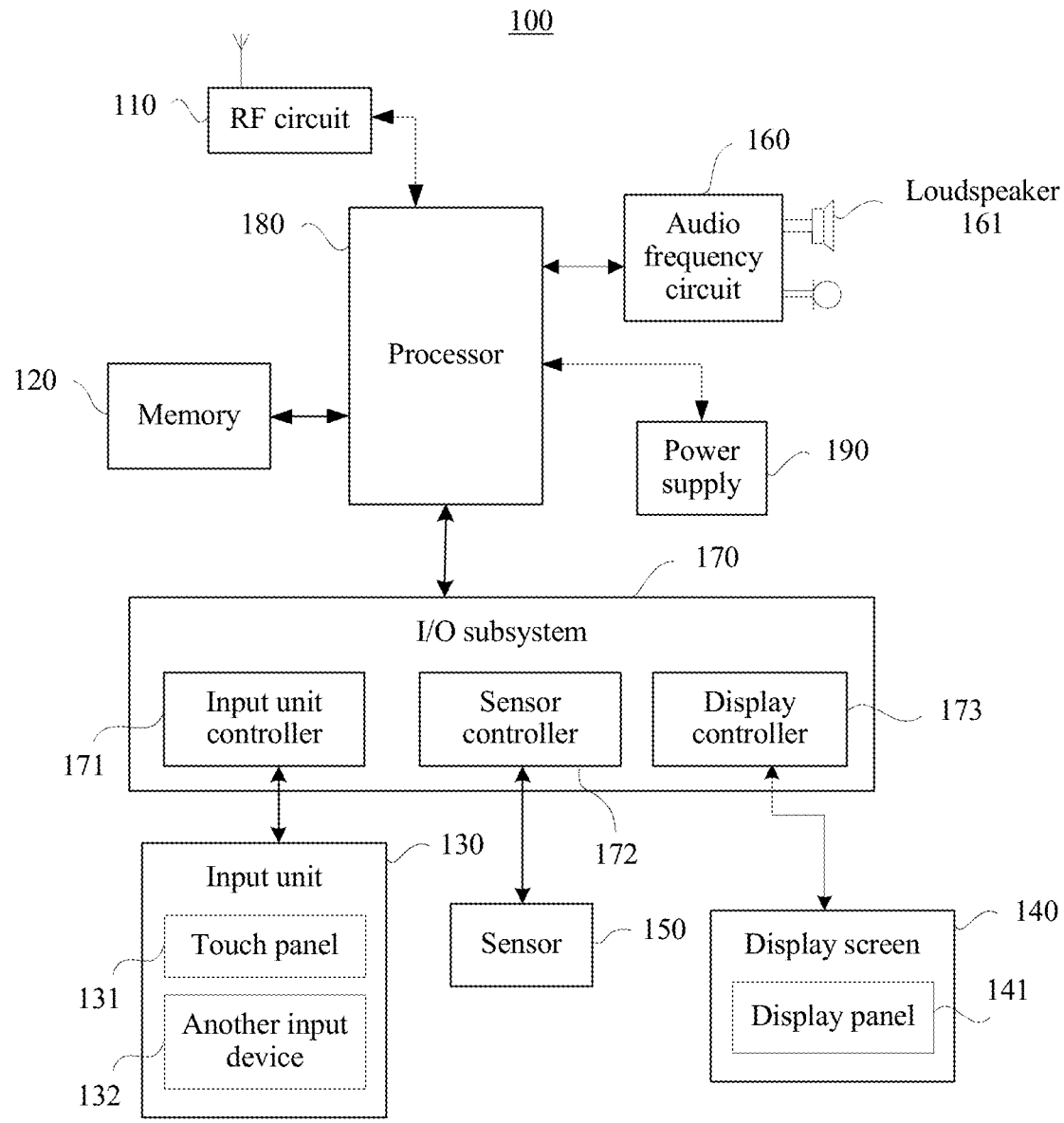
FIG. 1 is a schematic structural diagram of a first terminal according to an embodiment of the present invention.

In the embodiments of the present invention, a mobile phone is used as an example of the terminal for description. FIG. 1 is a block diagram of a partial structure of a mobile phone 100 related to the embodiments of the present invention. As shown in FIG. 1, the mobile phone 100 includes components such as a radio frequency (RF) circuit 110, a memory 120, an input unit 130, a display screen 140, a sensor 150, an audio frequency circuit 160, an input/output (I/O) subsystem 170, a processor 180, and a power supply 190. A person skilled in the art may understand that a terminal structure shown in FIG. 1 is only used as an example of implementation, and imposes no limitation on a terminal. The terminal may include more or fewer components than those shown in the figure, or combine some components, or have different component arrangements.

The RF circuit 110 may be configured to: receive and send a signal in an information receiving or sending process or in a call process; particularly, after receiving downlink information of a base station, send the downlink information to the processor 180 for processing; and send related uplink data to the base station. Generally, the RF circuit includes but is not limited to an antenna, at least one amplifier, a transceiver, a coupler, a low noise amplifier (LNA), a duplexer, and the like. In addition, the RF circuit 110 may further communicate with a network and another device through wireless communication. The wireless communication may use any communications standard or protocol, including but not limited to Global System for Mobile Communications (GSM), a general packet radio service (GPRS), Code Division Multiple Access (CDMA), Wideband Code Division Multiple Access (WCDMA), Long Term Evolution (LTE), an email, a short message service (SMS), and the like.

The memory 120 may be configured to store a software program and a module. The processor 180 executes various functional applications and data processing of the mobile phone 100 by running the software program and the module that are stored in the memory 120. The memory 120 may include a program storage area and a data storage area. The program storage area may store an operating system, an application required by at least one function (such as a sound playing function or an image playing function), and the like. The data storage area may store data (such as audio data, video data, or an address book) created based on use of the mobile phone 100, and the like. In addition, the memory 120 may include a volatile memory such as a nonvolatile dynamic random access memory (NVRAM), a phase change random access memory (PRAM), or a magnetoresistive random access memory (MRAM), or may include a nonvolatile memory such as at least one magnetic disk storage device, an electrically erasable programmable read-only memory (EEPROM), a flash memory device such as a NOR flash memory or a NAND flash memory, a semiconductor such as a solid state disk (SSD), or the like.

The input unit 130 may be configured to: receive input digit or character information, and generate key signal input related to a user setting and function control of the mobile phone 100. Specifically, the input unit 130 may include a touch panel 131 and another input device 132. The touch panel 131, also referred to as a touchscreen, may collect a touch operation performed by a user on or near the touch panel (for example, an operation performed by the user on or near the touch panel 131 by using any suitable object or accessory such as a finger or a stylus), and may drive a corresponding connection apparatus based on a preset program. Optionally, the touch panel 131 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into touch point coordinates, and sends the touch point coordinates to the processor 180, and can receive and execute a command sent by the processor 180. In addition, the touch panel 131 may be implemented by using a plurality of types such as a resistive type, a capacitive type, an infrared ray, and a surface acoustic wave. In addition to the touch panel 131, the input unit 130 may further include the another input device 132. Specifically, the another input device 132 may include but is not limited to one or more of a physical keyboard, a function key (such as a volume control key or an on/off key), a trackball, a mouse, a joystick, and the like.

The display screen 140 may be configured to display information entered by the user or information provided for the user, and various interfaces of the mobile phone 100. The display screen 140 may include a display panel 141. Optionally, the display panel 141 may be configured in a form of a liquid crystal display (LCD), a thin film transistor LCD (TFT-LCD), a light emitting diode (LED), an organic light-emitting diode (OLED), a flexible display screen, a force touch display screen, or the like. Further, the touch panel 131 may cover the display panel 141. When detecting the touch operation on or near the touch panel 131, the touch panel 131 transfers the touch operation to the processor 180 to determine a type of a touch event, and then the processor 180 provides corresponding visual output on the display panel 141 based on the type of the touch event. Although the touch panel 131 and the display panel 141 in FIG. 1 are used as two independent components to implement input and input functions of the mobile phone 100, in some embodiments, the touch panel 131 and the display panel 141 may be integrated to implement the input and output functions of the mobile phone 100. The display screen 140 may be configured to display content, and the content includes a user interface (UI) or a graphical user interface (GUI), for example, a startup interface of the terminal and a user interface of an application. The content may further include information and data. The display screen 140 is connected to a display controller 173. The display controller 173 may process content that is being displayed or to be displayed on the display screen 140, for example, a system desktop or an application interface, generate display data, and send the display data to the display screen 140 for display. When there are a plurality of display screens 140, the display controller 173 separately generates corresponding display data for different screens, and distributes the display data to respective display screens 140 for display. The display screen 140 may be a built-in screen of the terminal or another external display device.

The sensor 150 includes at least one optical sensor, a motion sensor, a location sensor, a Hall effect sensor, and another sensor. Specifically, the optical sensor may include an ambient optical sensor and a proximity sensor. The ambient optical sensor may obtain luminance of an ambient light. The proximity sensor may close the display panel 141 and/or backlight when the mobile phone 100 approaches an ear. The motion sensor may include an acceleration sensor that may detect acceleration magnitudes in all directions (generally three axes). When the acceleration sensor is stationary, the acceleration sensor may detect a magnitude and a direction of gravity, and may be configured to recognize a posture application of the mobile phone (such as switching between landscape and portrait, related games, and magnetometer posture calibration), vibration recognition related functions (such as a pedometer and a stroke), and the like. The location sensor may be configured to obtain geographical location coordinates of the terminal. The geographical location coordinates may be obtained by using a Global Positioning System (GPS), a COMPASS system, a GLONASS system, and a Galileo system, and the like. The location sensor may alternatively perform positioning by using a base station of a mobile operation network or a local area network such as Wi-Fi or Bluetooth, or by comprehensively using the foregoing positioning manners, to obtain more accurate mobile phone location information. The Hall effect sensor may change a status when a nearby magnetic field changes, for example, from on to off, or from off to on. A combination of the Hall effect sensor and a magnet may be used to detect a proximity status of two components, for example, detect whether two screens of the mobile phone 100 are close, or whether edges of the two screens are close. A gyroscope, a barometer, a hygrometer, a thermometer, an infrared sensor, and other sensors may be further configured for the mobile phone 100. Details are not described herein.

The audio frequency circuit 160, a loudspeaker 161, and a microphone 162 (also referred to as a microphone) may provide an audio interface between the user and the mobile phone 100. The audio frequency circuit 160 may transmit, to the loudspeaker 161, a received electrical signal converted from audio data, and the loudspeaker 161 converts the electrical signal into a sound signal for output. In addition, the microphone 162 converts a collected sound signal into an electrical signal. The audio frequency circuit 160 receives and converts the electrical signal into audio data, and then outputs the audio data to the processor 180 for processing. The processor 180 sends processed audio data to, for example, another terminal by using the RF circuit 110, or outputs the audio data to the memory 120 for further processing.

The I/O subsystem 170 may be configured to input or output various types of information or data of the system. The I/O subsystem 170 includes an input unit controller 171, a sensor controller 172, and the display controller 173. The I/O subsystem 170 receives, by using the foregoing controllers, various types of data sent by the input unit 130, the sensor 150, and the display screen 140, and controls the foregoing components by sending a control instruction.

The processor 180 is a control center of the mobile phone 100, uses various interfaces and lines to connect all parts of the entire mobile phone, and performs various functions and data processing of the mobile phone 100 by running or executing the software program and/or the module stored in the memory 120 and invoking data stored in the memory 120, to perform overall monitoring on the mobile phone. The processor 180 may be a central processing unit (CPU), a general-purpose processor, a digital signal processor (DSP), an application-specific integrated circuit (ASIC), a field programmable gate array (FPGA) or another programmable logic device, a transistor logic device, a hardware device, or any combination thereof. The processor 180 may implement or execute various examples of logical blocks, modules, and circuits that are described with reference to content disclosed in this application. Alternatively, the processor 180 may be a combination for implementing a computing function, for example, a combination of one or more microprocessors, or a combination of a DSP and a microprocessor. Optionally, the processor 180 may include one or more processor units. In one embodiment, an application processor and a modem processor may be integrated into the processor 180, the application processor mainly processes an operating system, a user interface, an application, and the like, and the modem processor mainly processes wireless communication. It may be understood that the modem processor may alternatively be not integrated into the processor 180.

The application includes any application installed on the mobile phone 100, including but not limited to a browser, an email, an instant message service, word processing, a virtual keyboard, a widget (Widget), encryption, digital rights management, speech recognition, speech reproduction, positioning (for example, a function provided by a GPS), music playing, and the like.

The mobile phone 100 further includes the power supply 190 (such as a battery) that supplies power to each component. In one embodiment, the power supply may be logically connected to the processor 180 by using a power management system, to implement functions such as charging and discharging management and power consumption management by using the power management system.

It should be noted that although not shown, the mobile phone 100 may further include a short-distance wireless transmission component such as a Wi-Fi module and Bluetooth, and details are not described herein.

A dual-screen terminal is used as an example below to describe, with reference to FIG. 2(A), FIG. 2(B), and FIG. 2(C) and FIG. 3(A), FIG. 3(B), FIG. 3(C), and FIG. 3(D), an external structure of a terminal provided in an embodiment of the present invention. It may be understood that the terminal provided in this embodiment of the present invention is not limited to the dual-screen terminal, and may be alternatively a terminal with more screens.

Figure 2A:
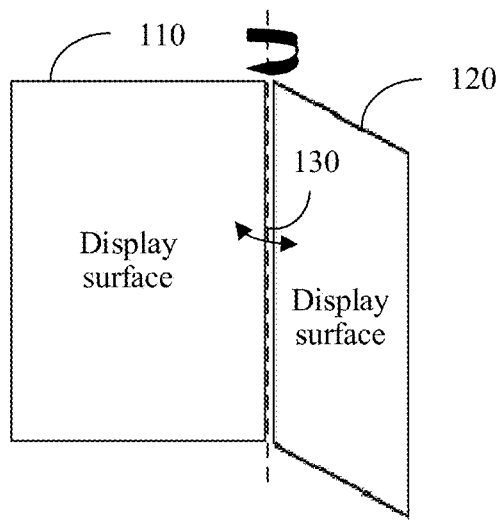
FIG. 2(A), FIG. 2(B), and FIG. 2(C) are schematic structural diagrams of a terminal according to an embodiment of the present invention.
Figure 2B:
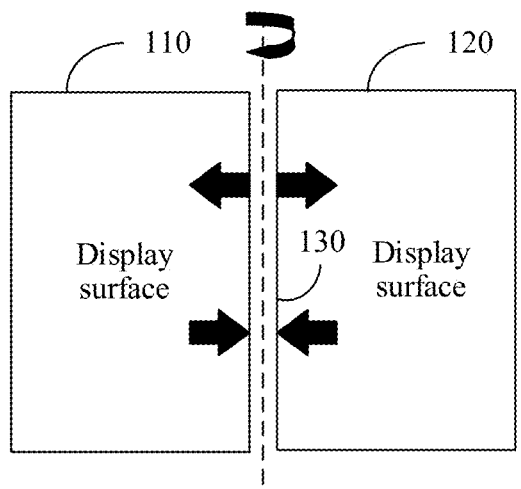
Figure 2C:
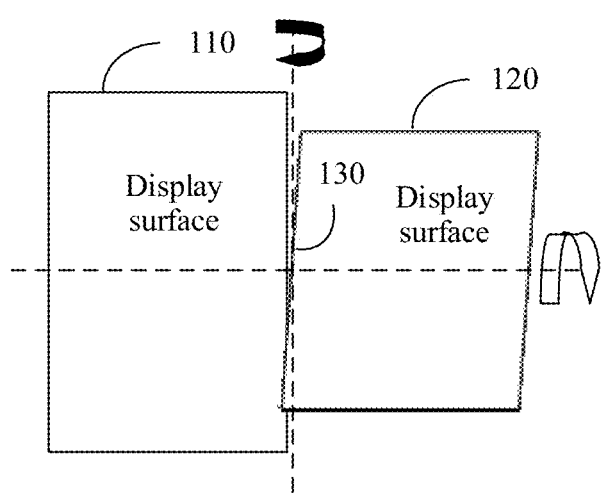

FIG. 2(A), FIG. 2(B), and FIG. 2(C) are schematic diagrams of an external structure of a terminal according to an embodiment of the present invention. A terminal 100 includes two screens 110 and 120 that are alternatively referred to as a first screen 110 and a second screen 120. Physical parameters of the two screens 110 and 120, such as a screen material, a size, and a resolution, may be the same or may be different. The two screens 110 and 120 are connected by using a connection structure 130. The connection structure 130 may include a single axis hinge, a magnetic connection structure, and a 2D hinge.

When the connection structure 130 is a single axis hinge, as shown in FIG. 2(A), the single axis hinge includes two hinged parts, one part is disposed on a side edge of the first screen 110, and the other part is disposed on a side edge of the second screen 120. The single axis hinge may be of any known single axis hinge type. The first screen 110 and the second screen 120 of the terminal 100 are placed face to face, and display surfaces of the two screens are adjacent to each other, to form an included angle between the display surfaces of the two screens. When the second screen 120 is flipped around the single axis hinge relative to the first screen 110, the included angle may change within a range from 0° to 360°.

When the connection structure 130 is a magnetic connection structure, as shown in FIG. 2(B), the first screen 110 and the second screen 120 may be mutually connected or separated. The magnetic connection structure includes at least two groups of magnets, one group of magnets are disposed on a side edge of the first screen 110, and the other group of magnets are disposed at a corresponding position on a side edge of the second screen 120. When the two side edges approach each other, the two screens are connected to each other; and when the two side edges are apart, the two screens are separated from each other. In one embodiment, positioning structures that help the two screens to position may be further disposed on the two side edges, for example, a convex part is disposed on one side edge, and a concave part is disposed at a relative position on the other side edge. The magnetic connection structure may be of any known magnetic connection structure type. When the first screen 110 and the second screen 120 are placed face to face, a terminal structure is similar to that in a case of the single axis hinge. When the first screen 110 and the second screen 120 are placed in a same direction, a display surface of one screen is adjacent to a non-display surface of the other screen.

When the connection structure 130 is a 2D hinge, as shown in FIG. 2(C), the 2D hinge includes two mutually orthogonal rotation axes, one rotation axis is connected to a side edge of the first screen 110, and the other rotation axis is connected to a corresponding position of a side edge of the second screen 120. The 2D hinge may be of any known 2D hinge type. By using the 2D hinge, the second screen 120 may rotate around a horizontal axis in the figure relative to the first screen 110, or may rotate around a vertical axis in the figure relative to the first screen 110. Therefore, the two screens 110 and 120 may be placed in face to face, or may be placed in a same direction.

Data may be transmitted between the two screens 110 and 120 through wired transmission or wireless transmission. In wired transmission, data transmission may be performed by using various data cables or by disposing an electronic contact or an interface on the connection structure 130. Wireless transmission may be data transmission that is based on various wireless communications protocols, for example, WIFI, WIFI-direct, Bluetooth, or near field communication (Near Field Communication, NFC).

FIG. 3(A), FIG. 3(B), FIG. 3(C), and FIG. 3(D) are schematic diagrams of a relative position status of terminal screens according to an embodiment of the present invention. Based on the external structure of the terminal shown in FIG. 2(A), FIG. 2(B), and FIG. 2(C), a terminal 100 may have at least four relative position statuses: a first position status shown in FIG. 3(A), a second position status shown in FIG. 3(B), a third position status shown in FIG. 3(C), and a fourth position status shown in FIG. 3(D). The foregoing four relative position statuses are respectively corresponding to four use manners of the terminal, and the foregoing four relative position statuses are specifically described below.

In the first position status, two screens 110 and 120 are deployed side by side, and are both located on a front surface of the terminal. In other words, an included angle between a first screen 110 and a second screen 120 is 180°. The two screens 110 and 120 may constitute an expanded screen relative to a single screen. The expanded screen may display a same application interface, for example, a two-level menu of an application, two-page content of an electronic book, or an enlarged photograph or video. Alternatively, the expanded screen may display a plurality of application interfaces. For example, each of the two screens displays one application interface, or displays more application interfaces.

In the second position status, two screens 110 and 120 are folded, one screen is located on a front surface of the terminal, and the other screen is located on a back surface of the terminal. For example, a first screen 110 is located on the front surface of the terminal, and a second screen 120 is located on the back surface of the terminal. In other words, an included angle between the first screen 110 and the second screen 120 is 360°. In this case, the screen on the front surface of the terminal may display content or perform a user operation, and the other screen may turn off or go to sleep. When the screen turns off, the screen neither displays any content nor performs any user operation. When the screen goes to sleep, the screen does not display any content, but may perform a user operation and receive a control instruction of a user. Optionally, the screen on the back surface may also be enabled based on a requirement, to display content or perform a user operation.

In the third position status, two screens 110 and 120 are folded. One screen is located on a front surface of the terminal, the other screen is folded, and a non-display surface of the other screen is located on a back surface of the terminal. For example, a first screen 110 is located on the front surface of the terminal, and a non-display surface of a second screen 120 is located on the back surface of the terminal. In other words, the terminal 100 uses only one screen. In this case, the terminal 100 is equivalent to a common single-screen terminal, and may implement all functions of the single-screen terminal.

In the fourth position status, two screens 110 and 120 are folded, a non-display surface of one screen is located on a front surface of the terminal, and a non-display surface of the other screen is located on a back surface of the terminal. For example, a non-display surface of a first screen 110 is located on the front surface of the terminal, and a non-display surface of a second screen 120 is located on the back surface of the terminal. In other words, the two screens of the terminal 100 are folded, and no screen is used. In this case, the terminal 100 may be in a standby or shutdown state.

In one embodiment, the terminal 100 may further have a fifth position status. In the fifth position status, two screens 110 and 120 are deployed side by side, one screen is located on a front surface of the terminal, and the other screen is located on a back surface of the terminal. For example, a first screen 110 is located on the front surface of the terminal, and a second screen 120 is located on the back surface of the terminal. A case of the fifth position status is similar to a case of the second position status. Therefore, refer to descriptions of the second position status and related content in this application. Details are not described herein again.

It may be understood that, for the external structure of the terminal shown in FIG. 2(A), FIG. 2(B), and FIG. 2(C), when the connection structure 130 of the screens is a single axis hinge, the terminal 100 may have the first, the second, and the fourth position statuses. When the connection structure of the screens is a magnetic connection structure or a 2D hinge, the terminal 100 may have the foregoing first to fifth position statuses.

Embodiment 1

Figure 4:
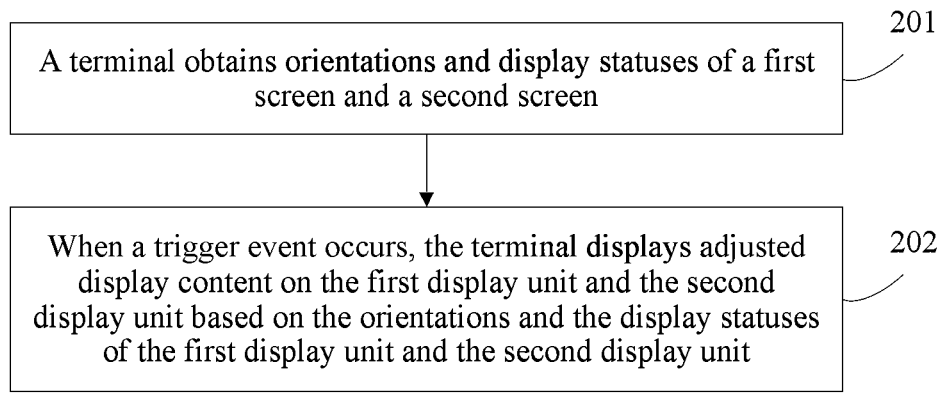
FIG. 4 is a flowchart of a display control method according to an embodiment of the present invention.

A display control method provided in this embodiment of the present invention is described with reference to FIG. 4 to FIG. 6(A) and FIG. 6(B). FIG. 4 is a flowchart of a display control method according to an embodiment of the present invention. The method is applied to a terminal that includes at least a first screen and a second screen, and the terminal includes at least the first screen and the second screen. The method includes the following operations:

Operation 201. The terminal obtains orientations and display statuses of the first screen and the second screen.

Operation 202. When a trigger event occurs, the terminal displays adjusted display content on the first screen and the second screen based on the orientations and the display statuses of the first screen and the second screen.

In operation 201, the orientations of the first screen and the second screen include a relative position status of the screens, a screen posture, and a screen on a front surface of the terminal.

The relative position status of the screens is shown in FIG. 3(A), FIG. 3(B), FIG. 3(C), and FIG. 3(D). For details, refer to the foregoing descriptions. The terminal may obtain the relative position status of the first screen and the second screen by using a sensor. The sensor may be an optical proximity sensor, or may be a Hall effect sensor, or may be a combination of the two.

Figure 5:
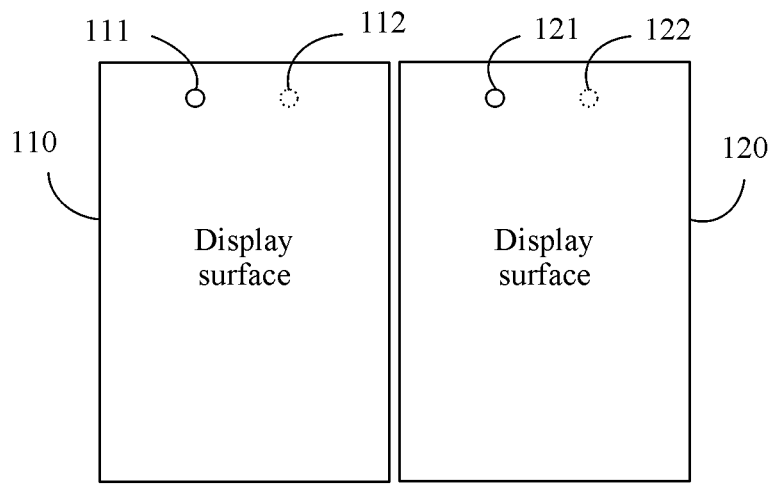
FIG. 5 is a schematic diagram of a first relative position status of terminal screens according to an embodiment of the present invention.

In an example, the terminal may obtain the relative position status of the screens by using the optical proximity sensor. As shown in FIG. 5, an optical proximity sensor 111 may be disposed on a display surface of a first screen 110, and an optical proximity sensor 112 may be disposed on a non-display surface of the first screen 110. An optical proximity sensor 121 may be disposed on a display surface of a second screen 120, and an optical proximity sensor 122 may be disposed on a non-display surface of the second screen 120. The optical proximity sensor may be configured to detect whether an object is approaching. Therefore, the terminal may determine the relative position status of the two screens by permuting and combining detection results of the optical proximity sensors.

Table 1 shows a relationship between a detection result of an optical proximity sensor and a relative position status of screens, "yes" indicates that the optical proximity sensor detects that an object is approaching, and "no" indicates that the optical proximity sensor detects that no object is approaching.

In one embodiment, in a first position status, no optical proximity sensor is blocked. Therefore, the optical proximity sensors 111, 112, 121, and 122 detect that no object is approaching.

In a second position status, the optical proximity sensors 112 and 122 are blocked by a screen. Therefore, the optical proximity sensors 111 and 121 detect that no object is approaching, and the optical proximity sensors 112 and 122 detect that an object is approaching.

In a third position status, the optical proximity sensors 112 and 121 are blocked by a screen. Therefore, the optical proximity sensors 111 and 122 detect that no object is approaching, and the optical proximity sensors 112 and 121 detect that an object is approaching.

In a fourth position status, the optical proximity sensors 111 and 121 are blocked by a screen. Therefore, the optical proximity sensors 112 and 122 detect that no object is approaching, and the optical proximity sensors 111 and 121 detect that an object is approaching.

TABLE 1

Relationship between a detection result of an optical proximity sensor and a relative position status of screens

|  | First position status | Second position status | Third position status | Fourth position status |
|---|---|---|---|---|
| Optical proximity sensor 111 | No | No | No | Yes |
| Optical proximity sensor 112 | No | Yes | Yes | No |
| Optical proximity sensor 121 | No | No | Yes | Yes |
| Optical proximity sensor 122 | No | Yes | No | No |

In one embodiment, only one optical proximity sensor may be disposed on the second screen 120. For example, the optical proximity sensor 121 may be disposed on the display surface of the second screen 120, or the optical proximity sensor 122 may be disposed on the non-display surface of the second screen 120. The relative position status of the two screens may be determined based on permutations and combinations of detection results of the optical proximity sensors 111, 112, and 121 (or 122) shown in Table 1.

In one embodiment, when the first screen 110 and the second screen 120 are connected by using a single axis hinge, the relative position status includes only the first, the second, and the fourth position statuses. Therefore, a quantity of optical proximity sensors can be further reduced. For example, the optical proximity sensor 111 may be disposed on the display surface of the first screen 110, and the optical proximity sensor 112 may be disposed on the non-display surface of the first screen 110. The relative position status of the two screens may be determined based on permutations and combinations of detection results of the optical proximity sensors 111 and 112 shown in Table 1.

It may be understood that, in one embodiment of the present invention, a position (for example, an upper part or a lower part of the screen) of the optical proximity sensor on the screen may be set based on an actual requirement. This is not limited in this application.

Figure 6A:
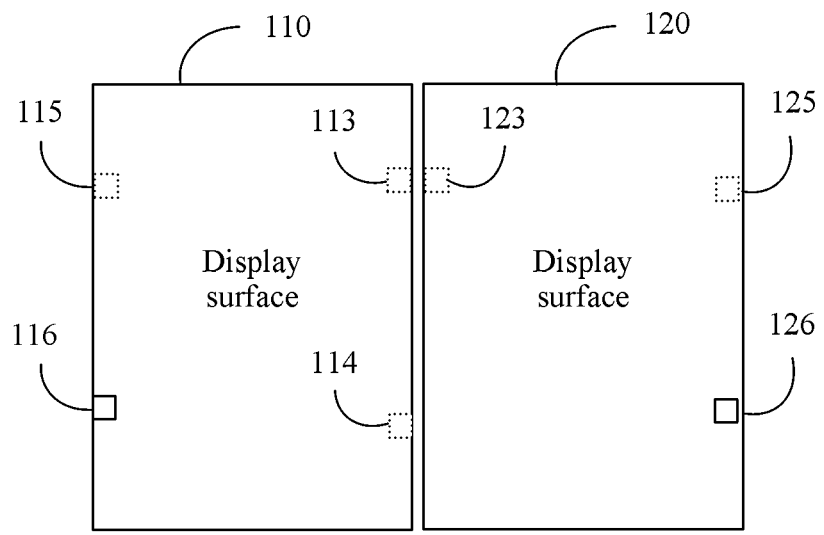
FIG. 6(A) and FIG. 6(B) are schematic diagrams of a second relative position status of terminal screens according to an embodiment of the present invention.
Figure 6B:
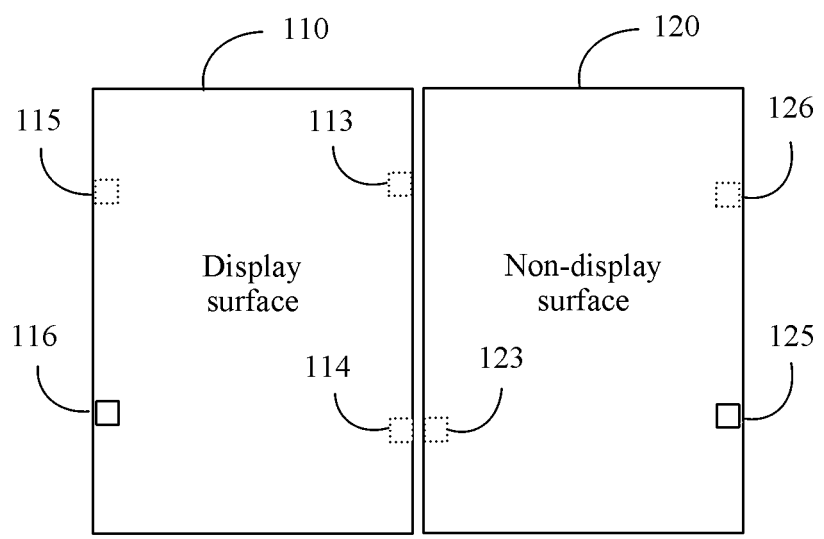

In another example, the terminal may obtain the relative position status of the screens by using the Hall effect sensor. As shown in FIG. 6(A), Hall effect sensors 113 and 114 may be disposed on a side edge of the first screen 110 adjacent to a hinge, and a magnet 123 may be disposed on a side edge of the second screen 120 adjacent to the hinge. When the first screen 110 and the second screen 120 are placed face to face, the Hall effect sensor 113 is close to the magnet 123. As shown in FIG. 6(B), when the first screen 110 and the second screen 120 are placed in a same direction, the Hall effect sensor 114 is close to the magnet 123.

In addition, Hall effect sensors 115 and 116 may be disposed on a side edge of the first screen 110 opposite to the hinge, and magnets 125 and 126 may be disposed on a side edge of the second screen 120 opposite to the hinge. In addition, the Hall effect sensor 115 is located on the non-display surface of the first screen 110, and the magnet 125 is located on the non-display surface of the second screen 120. The Hall effect sensor 116 is located on the display surface of the first screen 110, and the magnet 126 is located on the display surface of the second screen 120.

The Hall effect sensor may change a status when a magnetic field changes, for example, from on to off, or from off to on. For example, the Hall effect sensor is off when approaching the magnet. The terminal may determine the position status of the two screens based on permutations and combinations of Hall effect sensor statuses.

Table 2 shows a relationship between a Hall effect sensor status and a relative position status of screens, "on" indicates that a Hall effect sensor is on, and "off" indicates that a Hall effect sensor is off.

In one embodiment, in the first position status, the Hall effect sensor 113 is close to the magnet 123. Therefore, the Hall effect sensor 113 is off, and the Hall effect sensors 114, 115, and 116 are on.

In the second position status, the Hall effect sensor 113 is close to the magnet 123, and the Hall effect sensor 115 is close to the magnet 125. Therefore, the Hall effect sensors 113 and 115 are off, and the Hall effect sensors 114 and 116 are on.

In the third position status, the Hall effect sensor 114 is close to the magnet 123, and the Hall effect sensor 115 is close to the magnet 126. Therefore, the Hall effect sensors 113 and 116 are on, and the Hall effect sensors 114 and 115 are off.

In the fourth position status, the Hall effect sensor 113 is close to the magnet 123, and the Hall effect sensor 116 is close to the magnet 126. Therefore, the Hall effect sensors 113 and 116 are off, and the Hall effect sensors 114 and 115 are on.

TABLE 2

Relationship between a Hall effect sensor status and a position status of screens

|  | First position status | Second position status | Third position status | Fourth position status |
|---|---|---|---|---|
| Hall effect sensor 113 | Off | Off | On | Off |
| Hall effect sensor 114 | On | On | Off | On |
| Hall effect sensor 115 | On | Off | Off | On |
| Hall effect sensor 116 | On | Off | On | Off |

In one embodiment, the Hall effect sensor 115 may be located on the display screen of the first screen 110, and the magnet 125 may be located on the display surface of the second screen 110. The Hall effect sensor 116 may be located on the non-display surface of the first screen 110, and the magnet 126 is located on the non-display surface of the second screen 120.

In one embodiment, when the first screen 110 and the second screen 120 are connected by using a single axis hinge, the position status of the two screens includes only the first, the second, and the fourth position statuses. Therefore, a quantity of Hall effect sensors can be reduced. For example, the Hall effect sensors 115 and 116 may be disposed on the first screen 110, and the relative position status of the two screens may be determined based on permutations and combinations of statuses of the Hall effect sensors 115 and 116 shown in Table 2.

In one embodiment, positions of the Hall effect sensor and the magnet may be exchanged, and the positions (for example, the upper part or the lower part) of the Hall effect sensor and the magnet on the screen may be set based on an actual requirement. This is not limited in this application. In addition, the Hall effect sensor may also be set to be on when the Hall effect sensor is close to the magnet.

In some other examples, the optical proximity sensor and the Hall effect sensor may be further comprehensively used. The terminal may determine the relative position status of the two screens based on the detection result of the optical proximity sensor and permutations and combinations of Hall effect sensor statuses. In addition, a relative position relationship of terminal screens may also be determined by using a known method, and details are not described herein.

The screen posture includes landscape placement and portrait portrait. Landscape may be that a connection structure for terminal screens is placed in a horizontal direction, and portrait may be that the connection structure for terminal screens is placed in a vertical direction. The terminal may obtain the screen posture by using a motion sensor. The motion sensor includes a gravity sensor or a gyroscope. The screen gesture of the terminal may be switched between landscape placement and portrait placement. For example, the terminal screen is rotated from landscape placement to portrait placement. In a rotation process, the terminal may measure a rotation angle of the terminal by using the motion sensor. When the rotation angle exceeds a preset threshold, the terminal determines that the screen posture is switched to portrait placement. The preset threshold may be determined based on an actual situation, for example, may be set to 45°.

In one embodiment, when the terminal uses a single axis hinge for connection, a motion sensor may be disposed on one of the screens, so that the two screens share the motion sensor to obtain the screen posture.

In one embodiment, when the terminal uses a magnetic connection structure or a 2D hinge for connection, a motion sensor may be disposed on each of the two screens, to separately obtain screen postures of the two screens.

A screen (also referred to as a primary screen) currently used by a user may be a screen on the front surface of the terminal, in other words, a screen facing the user. Correspondingly, a screen on a back surface of the terminal may be referred to as a secondary screen. The terminal may determine the primary screen by using a camera, or may determine the primary screen by using a display status of the screen.

A method for determining the primary screen is described below with reference to the relative position status of the screens.

In the first position status, the terminal may determine the two screens as primary screens.

In the third position status, the terminal may determine one of the two screens that is located outside as the primary screen. For example, the terminal may determine, based on optical proximity sensors on the two screens, the screen that is located outside. Specifically, when an optical proximity sensor always detects that an object is approaching, a screen to which the optical proximity sensor belongs is located inside the terminal. Alternatively, when an optical proximity sensor detects that no object is approaching, a screen to which the optical proximity sensor belongs is located outside the terminal.

In the fourth position status, the terminal does not need to determine the primary screen.

In the second position status, the terminal may determine the primary screen in any one of the following manners.

In an example, a camera may be disposed on each of the two screens of the terminal, and the terminal identifies a user face by using the camera to determine a currently used screen. For example, when the user uses one screen, a camera on the screen may identify the user. Therefore, the terminal determines the screen as the primary screen and determines the other screen as the secondary screen. The user may be identified by the camera by using an existing method, and details are not described herein.

In another example, the terminal may determine the primary screen based on an on/off status of the two screens.

For example, a screen currently in an on state is the primary screen, and a screen currently in a sleep or off state is the secondary screen.

In another example, the terminal may determine the primary screen based on whether the two screens are locked. For example, an unlocked screen is determined as the primary screen, and a locked screen is determined as the secondary screen.

The terminal may further determine the primary screen by using another known method, and details are not described herein.

The terminal may obtain display content of the screen by using a display controller, or may obtain display content of the screen by using a processor. The display content of the screen may be obtained by using an existing method, and details are not described herein.

The display status of the screen includes an on/off status of the screen and the display content.

The on/off status of the screen includes an on state, a sleep state, and an off state. The terminal may obtain the on/off status of the screen by using the display controller 173 or the processor 180 described above. When the screen turns on, the screen may display various types of content, and may perform a user operation and receive a control instruction of the user. When the screen goes to sleep, the screen does not display any content, but may perform a user operation. When the screen turns off, the screen neither displays any content nor performs a user operation.

The display content of the screen includes a system desktop or an application interface that is being displayed or to be displayed on the terminal. The display content may be obtained by using the display controller 173 or the processor 180 described above.

The system desktop may include a notification bar area, an icon display area, and a shortcut application area, and may further include a widget (Widget). There may be one or more icon display areas, and the terminal may display one icon display area on the screen at a time. When the system desktop includes a plurality of icon display areas, one of the icon display areas may be a primary icon display area, and remaining icon display areas are secondary icon display areas. The primary icon display area is an icon display area that is displayed after the terminal is unlocked in a common case. When the system desktop includes one icon display area, the icon display area may be the primary icon display area.

In one embodiment, the system desktop may further include HiBoard, and HiBoard may include content such as a search box, an application link that is commonly used by the user, various types of message notifications, and news. HiBoard is usually located on a leftmost side of the icon display area.

The application interface may also be referred to as an application window, and include an interface size and an interface position.

The interface size may be represented by a resolution. For example, when a quantity of pixels in an interface width direction is 1080 and a quantity of pixels in a height direction is 720, the interface size may be represented as a resolution of 1080×720. It should be noted that, in case of no ambiguity, a width or a height mentioned in this specification means a quantity of pixels in a width or height direction.

The interface position may be determined by position coordinates of an upper left corner of the application interface relative to an upper left corner of the terminal screen. For example, when the terminal screen is in the first position status and the first screen is located on a left side of the second screen, an upper left corner vertex of the first screen is an origin. When the application interface is displayed on the first screen, position coordinates of the application interface are (0, 0). When the application interface is displayed on the second screen, position coordinates of the application interface are (W+1, 0), and W is a width of the first screen.

In operation 202, the trigger event is used to trigger the terminal to adjust the display statuses of the first screen and the second screen. The trigger event may be orientation changes of the first screen and the second screen, or may be a preset user operation, or may be a preset application activity, or may be a combination of the foregoing trigger events.

The orientation changes of the first screen and the second screen may be a relative position status change of the screens, for example, the screens are switched from the first position status to the second position status; or the orientation changes of the first screen and the second screen may be a screen posture change, for example, the screens are switched from landscape placement to portrait placement; or the orientation changes of the first screen and the second screen may be a change of the screen being used by the user, for example, the screens are in the second position status, and the user uses the first screen. When the second screen rotates to the front surface of the terminal, the user uses the second screen. In this case, the screen being used by the user changes.

The terminal may detect the orientation changes of the first screen and the second screen by using the method described in operation 201. If the terminal detects the orientation changes of the first screen and the second screen, the terminal determines that the trigger event occurs. Otherwise, the terminal determines that the trigger event does not occur.

The preset user operation may be used to determine whether the user operation is a user operation for adjusting the display status and the display content of the terminal screen, for example, an operation such as finger pressing, sliding, or drawing a specific graph.

In an example, the preset user operation may be an operation performed by the user in a preset area of the screen. For example, a specific area may be separated from the screen. If the terminal detects that the user performs the operation in the preset area, the terminal determines that the user performs the preset user operation.

In another example, the preset user operation may alternatively be that the user performs a preset gesture operation on the screen. For example, a specific gesture may be set, for example, tapping the screen for more than preset duration, or a sliding track on the screen is a closed triangle, square, or circle. If the terminal detects that the user performs the preset gesture operation, the terminal determines that the user performs the preset user operation.

In another example, the preset user operation may alternatively be performing the preset gesture operation in the preset area of the screen, in other words, a combination of the foregoing two manners. For example, the user may be set to perform a specific gesture (for example, pressing the screen for more than the preset duration, or the sliding track on the screen is a closed triangle, square, or circle) in the specific area of the screen, and the terminal determines that the user performs the preset user operation.

It may be understood that the foregoing preset user operation is merely an example description, and the preset user operation may be flexibly set or defined based on an actual requirement.

The terminal may detect the operation performed by the user on the screen, and match the user operation with the preset user operation. If the matching succeeds, the terminal determines that the trigger event occurs. Otherwise, the terminal determines that the trigger event does not occur. The terminal may detect the user operation by using the input unit controller 171 described above.

The preset application activity may be used to determine whether an application activity is an application activity for adjusting the display status and the display content of the terminal screen, for example, receiving new content that needs to be displayed, such as an incoming call, a short message, an instant messaging message, or a message notification of another application.

The preset application activity may be managed and defined by the user. For example, the user may define the incoming call, the short message, and an instant messaging application as high-priority applications. When the foregoing high-priority applications receive the new content, the terminal determines that the trigger event occurs.

The terminal may detect the application activity, and match the application activity with the preset user operation. If the matching succeeds, the terminal determines that the trigger event occurs. Otherwise, the terminal determines that the trigger event does not occur. The terminal may detect the application activity by using the processor 180 described above.

In one embodiment, when determining that the application activity is the preset application activity, the terminal may send, to the user, a prompt for adjusting the display status and the display content of the screen. For example, the terminal may provide a corresponding text prompt on a display screen currently used by the user, or directly provide a prompt through vibration and/or sound. In this way, the user may determine, by using the user operation, whether to adjust the display status of the screen.

When the trigger event for adjusting the display status and the display content of the screen occurs, the terminal adjusts a display status of each screen based on the obtained orientations and the current display statuses of the first screen and the second screen, and displays the adjusted display content on the first screen, the second screen, or the first screen and the second screen. Specifically, the terminal may adjust the display status of the screen based on an orientation of the screen. For example, when the screens are in the first position status, the terminal may enable the two screens; and when the screens are in the second position status, the terminal may enable a screen on the front surface of the terminal, and may set a screen on the back surface of the terminal to an off or standby state. The terminal may further re-determine sizes and positions of the system desktop and the application interface. The terminal may send an adjusted display status of the screen to the processor or the display controller, generate display data of each screen, and distribute the display data to each screen for display. The terminal may generate the display data and distribute the foregoing data to each screen for display by using an existing method. For example, an interface UI of each application is drawn based on a SurfaceFlinger service of an Android system, and details are not described herein.

In an example, the terminal screens are in the first position status, and sizes of the two screens are the same. A width and a height are respectively W and H. When the screen posture is landscape, the terminal generates display data based on a screen size of 2W×H, and distributes the display data to the first screen and the second screen for display. When the screen posture is portrait, the terminal generates display data based on a screen size of H×2W, and distributes the display data to the first screen and the second screen for display.

In one embodiment, the sizes of the two screens of the terminal may also be different. A width and a height of the first screen are respectively $W_1$ and $H_1$, and a width and a height of the first screen are respectively $W_2$ and $H_2$. When the screen posture is landscape, the terminal may generate display data by using a window based on a screen size of $W_1 \times H_1$, and generate display data by using another window based on a screen size of $W_2 \times H_2$. When the screen posture is portrait, the terminal may generate display data by using a window based on a screen size of $W_1 \times H_1$, generate display data by using another window based on a screen size of $W_2 \times H_2$, and distribute the display data to the first screen and the second screen for display.

In another example, the terminal screens are in the second position status, and sizes of the two screens are the same. A width is W, and a height is H. The first screen turns on, and the second screen turns off. When the screen posture is landscape, the terminal may generate display data based on a screen size of W×H. When the two screens of the terminal are switched from the second position status to the first position status, the first screen keeps on, the second screen is switched from off to on, and the terminal may generate display data based on a screen size of W×2H. When the screen posture is portrait, the terminal generates display data based on a screen size of 2H×W. After generating the display data, the terminal distributes the display data to the first screen and the second screen for display.

In one embodiment of the present invention, the terminal obtains an orientation, a display status, and display content of a screen. When determining that the trigger event occurs, the terminal may adjust the display status of the screen in a timely manner, so that a user can perform an interaction operation and interaction display between different screens, thereby improving user experience.

Terminal display solutions in different scenarios are further described below with reference to FIG. 7(A) and FIG. 7(B) to FIG. 16A and FIG. 16B by using a relative position status of screens of a dual-screen terminal as a scenario.

Scenario 1

Two screens of a terminal are in a first position status, and the two screens may constitute an expanded screen. Compared with a single screen, the expanded screen may be used to display more content. The content includes an expanded system desktop, an expanded application interface, a plurality of application interfaces, or the like.

The expanded system desktop may include an expanded notification area, an expanded icon display area, and an expanded shortcut application area.

The expanded application interface may be expanded display of an application interface, for example, displaying an enlarged photograph or video on an expanded screen. The expanded application interface may alternatively be a plurality of interfaces of one application. For example, the application includes a two-level menu. The terminal may display a first-level menu on one screen, and display a second-level menu on the other screen.

The plurality of application interfaces may be interfaces of a plurality of applications run by the terminal on the foreground. For example, when the terminal runs two applications on the foreground, the terminal may display one application interface on one screen, and display the other application interface on the other screen.

When the terminal determines that a trigger event occurs, the terminal adjusts a display status of the screen. The trigger event may include a screen posture change, a user operation, an application activity, or the like.

Figure 7A:
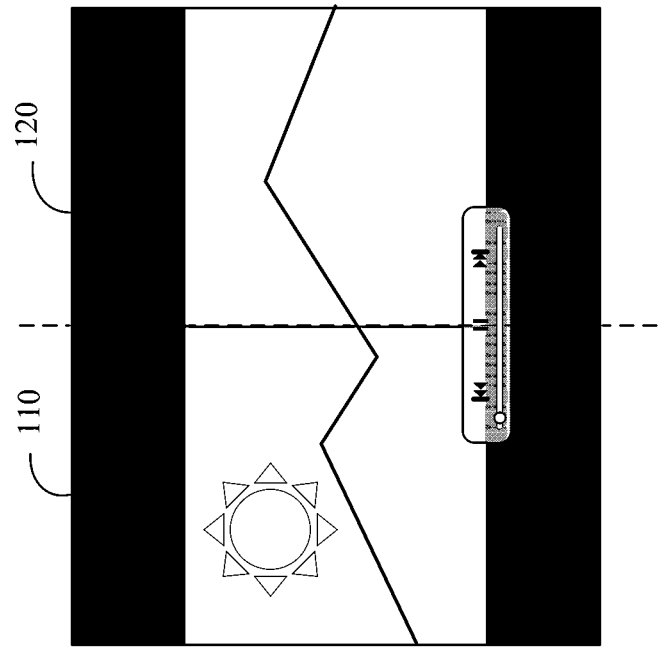
FIG. 7(A) and FIG. 7(B) are schematic diagrams of a first display solution in a first scenario according to an embodiment of the present invention.
Figure 7B:
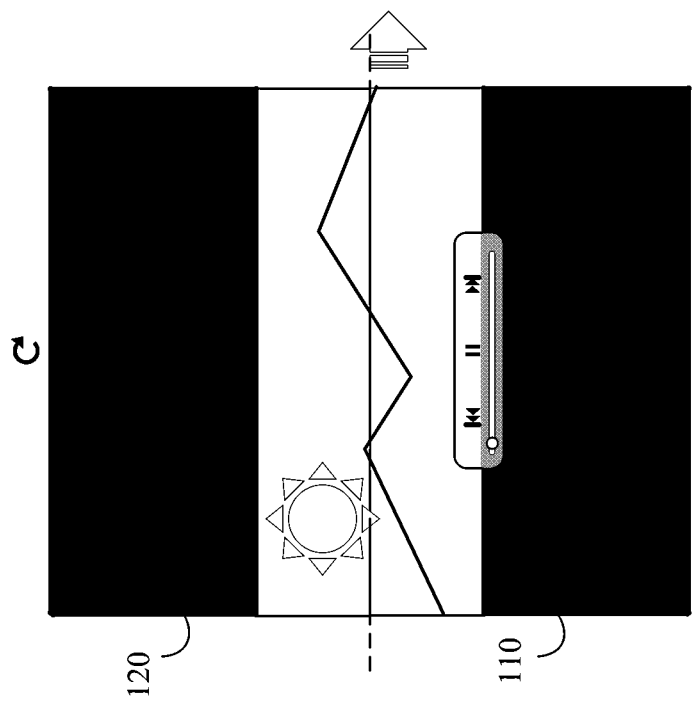

In an example, as shown in FIG. 7(A), the terminal is a landscape posture, in other words, a screen hinge is placed in a horizontal direction. A first screen is located at the bottom, and a second screen is located at the top. The terminal displays a video application interface, and this video application plays video in a maximized manner. In this case, the relative position status, the display status, and the display content of the terminal screens are as follows: The two screens are on, the first screen displays lower half content of the video, and the second screen displays upper half content of the video. When the terminal rotates clockwise to a portrait posture, in other words, the terminal rotates 90° clockwise, as shown in FIG. 7(B), the terminal detects a posture change, and determines that the trigger event occurs. When the relative position status of the screens does not change, the terminal keeps the two screens on, re-layouts the video application interface based on a direction obtained after rotation, displays left half content of the video on the first screen, and displays right half content of the video on the second screen.

In one embodiment, when the terminal is in a landscape posture, the video application interface may not be displayed in the middle of the screen, but is displayed on one of the two screens, for example, the first screen or the second screen. When detecting a posture change, the terminal determines that the trigger event occurs, and adjusts the display status of the screen.

By detecting the posture change, the terminal may determine that the trigger event occurs, to adaptively adjust the display content.

In another example, as shown in FIG. 8(A), the terminal is in a landscape posture. The first screen is located at the bottom, and the second screen is located at the top. The first screen displays a video application interface, and the second screen displays another application interface or a system desktop. The terminal runs an instant messaging application on the background, and an instant messaging application interface is located at a next layer of the video application interface. The user performs single-finger sliding from the first screen to the second screen. When this operation matches the preset user operation of switching the application interface, the terminal determines that the trigger event occurs. As shown in FIG. 8(B), when the screen orientation does not change, the terminal keeps the two screens on, re-layouts the video application interface and the instant messaging application interface, displays the instant messaging application interface on the first screen, and displays the video application interface on the second screen.

In one embodiment, the terminal may display an animation effect that the video application interface smoothly moves from the first screen to the second screen.

In one embodiment, the instant messaging application interface further includes one or more application interfaces, and the terminal may move the one or more application interfaces from the first screen to the second screen layer by layer by using the user operation. When moving to the second screen, an application window may cover, layer by layer, application interfaces displayed on the second screen. In addition, the terminal may move, by using the user operation, the application interface displayed on the second screen to the first screen. When moving to the first screen, the application window may cover, layer by layer, application interfaces displayed on the first screen.

In one embodiment, the terminal may disable, layer by layer by using the user operation, application interfaces displayed on the two screens. In other words, the terminal may disable application interfaces at topmost layers of the two screens, to display a next-layer application interface.

The terminal may determine, by detecting the user operation, that the trigger event occurs, adjust a position of the application interface, and combine different application interfaces.

In another example, as shown in FIG. 9(A), the terminal is in a portrait posture, the first screen is on a left side, and the second screen is on a right side. The terminal maximizes display of a video application interface on an expanded screen. When the terminal detects an application activity, for example, a mobile phone application receives an incoming call, the terminal determines that a trigger event occurs. As shown in FIG. 9(B), the terminal adjusts an application layout, displays the activity application on the first screen, and displays the video application interface on the second screen. When the user completes processing the application activity, for example, disconnecting the incoming call or tapping to send a short message, the terminal restores the video application interface to an expanded interface.

In one embodiment, the terminal may adjust an application status based on an application type. For example, when an application is a video or music application, when adjusting an interface of the application, the terminal may switch the application from a play state to a pause state. When the terminal is restored to the expanded interface for display, the terminal may switch the application from the pause state to the play state.

The terminal may determine, by detecting the application activity, that the trigger event occurs. When providing the expanded screen, the terminal simultaneously responds to an important event in a timely manner, and implements multi-task processing.

Scenario 2

Two screens of a terminal are in a second position status, one screen faces a front surface of the terminal, and the other screen faces a back surface of the terminal. In a second position status, the terminal may display different content on the two screens. For example, the screen on the front surface of the terminal displays main content on which a user focuses, and the screen on the back surface of the terminal displays other content. The terminal may alternatively enable only the screen on the front surface of the terminal, and enable the screen on the back surface of the terminal to be in a sleep state or an off state. Optionally, the terminal may alternatively lock the screen on the back surface of the terminal, so that the screen cannot receive a user operation.

When the terminal determines that a trigger event occurs, the terminal adjusts a display status of the screen. The trigger event may include a screen posture change, the user operation, an application activity, or the like.

The terminal may switch display content of the two screens based on the trigger event, and the terminal may also control display content of a front screen based on an operation that is performed by the user on the screen on the back surface of the terminal, to cause interaction between the two screens.

Figure 10A:
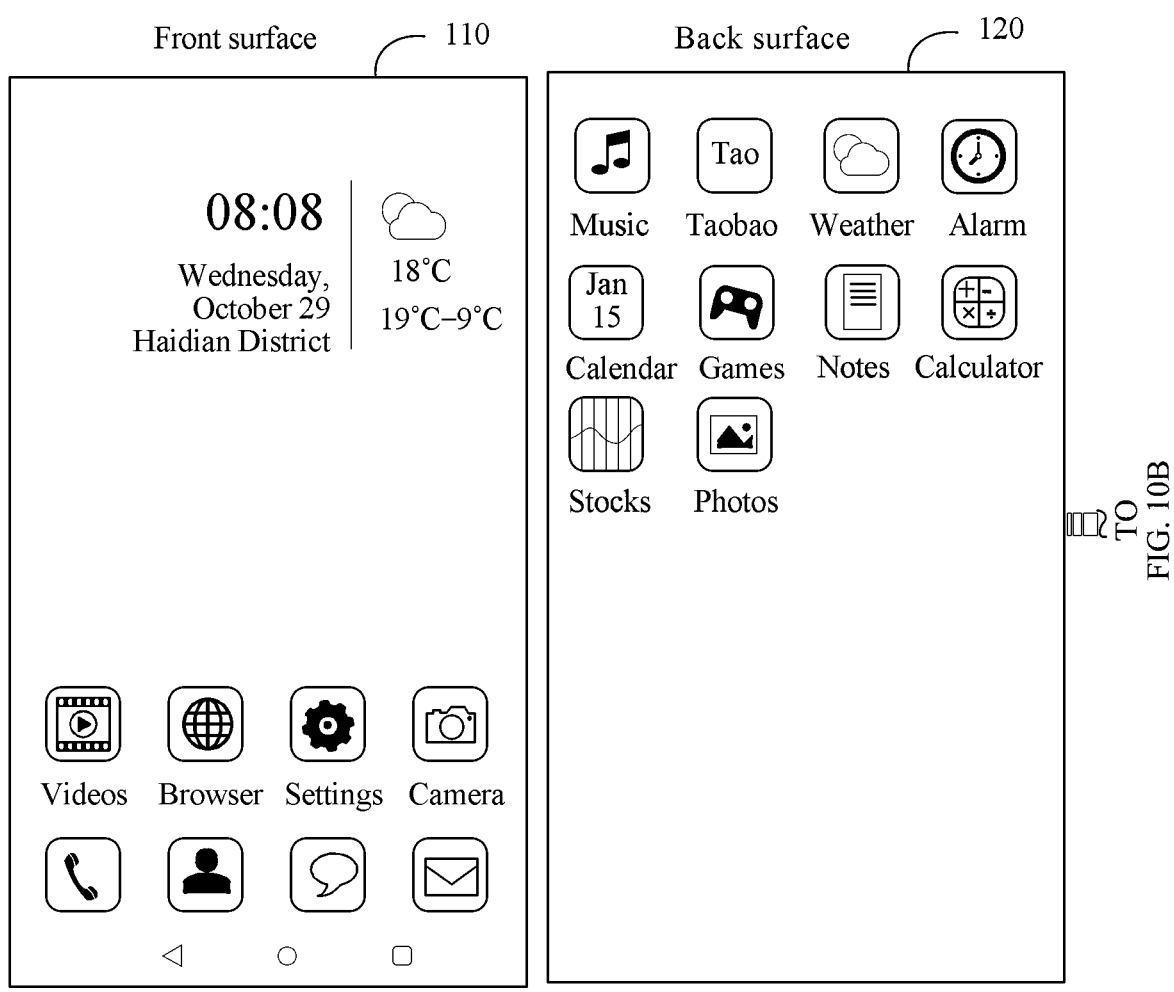
FIG. 10A and FIG. 10B are a schematic diagram of a first display solution in a second scenario according to an embodiment of the present invention.
Figure 10B:
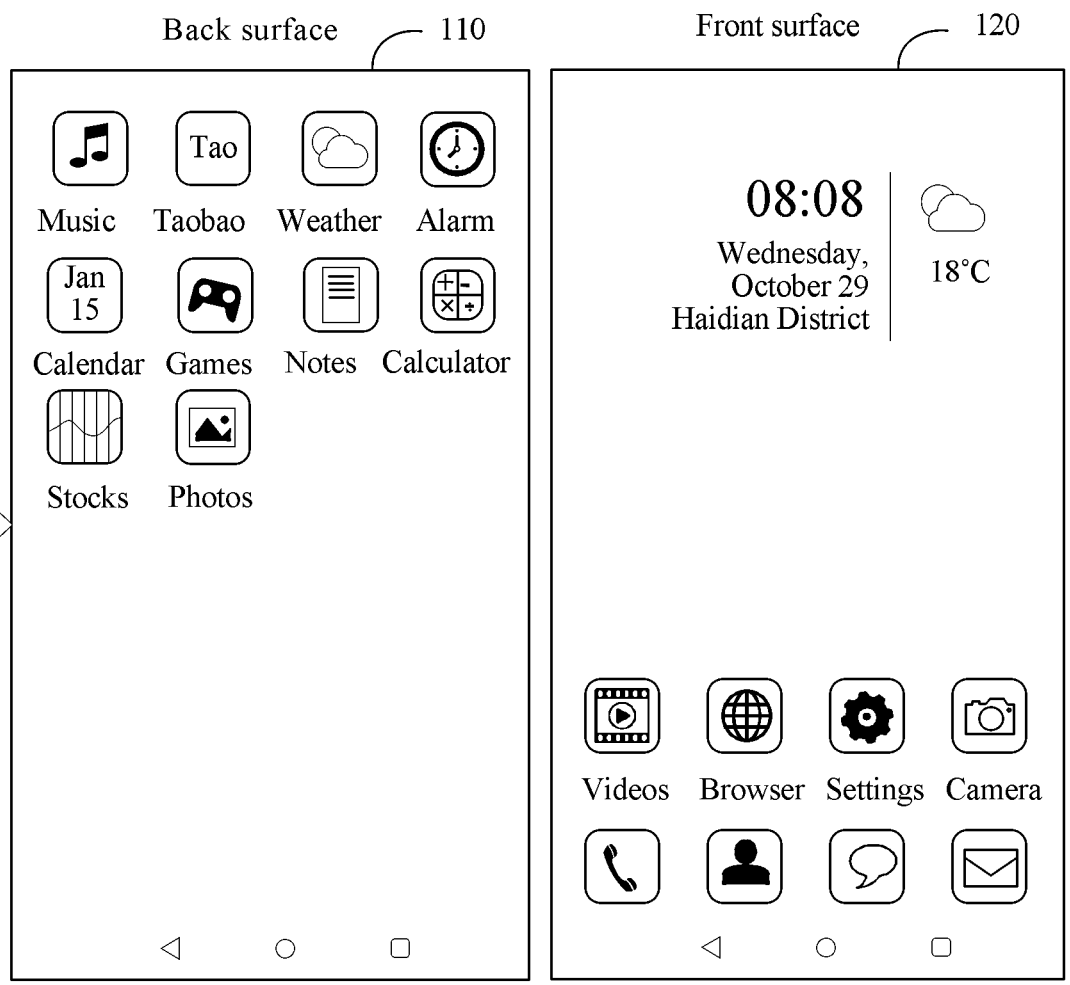

In an example, as shown in FIG. 10A, the first screen of the terminal is located on the front surface, and the second screen is located on the back surface. The terminal displays a primary icon display area on the first screen, and displays an adjacent icon display area on the second screen. As shown in FIG. 10B, when positions of the two screens are exchanged, in other words, the first screen rotates to the back surface, and the second screen rotates to the front surface, the terminal determines that the trigger event occurs. The terminal keeps the two screens on, switches the display content of the two screens, displays the primary icon display area on the second screen, and displays the adjacent icon display areas on the first screen.

In one embodiment, the terminal may separately display different application interfaces or different windows of an application on the two screens. When the positions of the two screens are exchanged, the terminal switches the display content of the two screens.

Figure 11A:
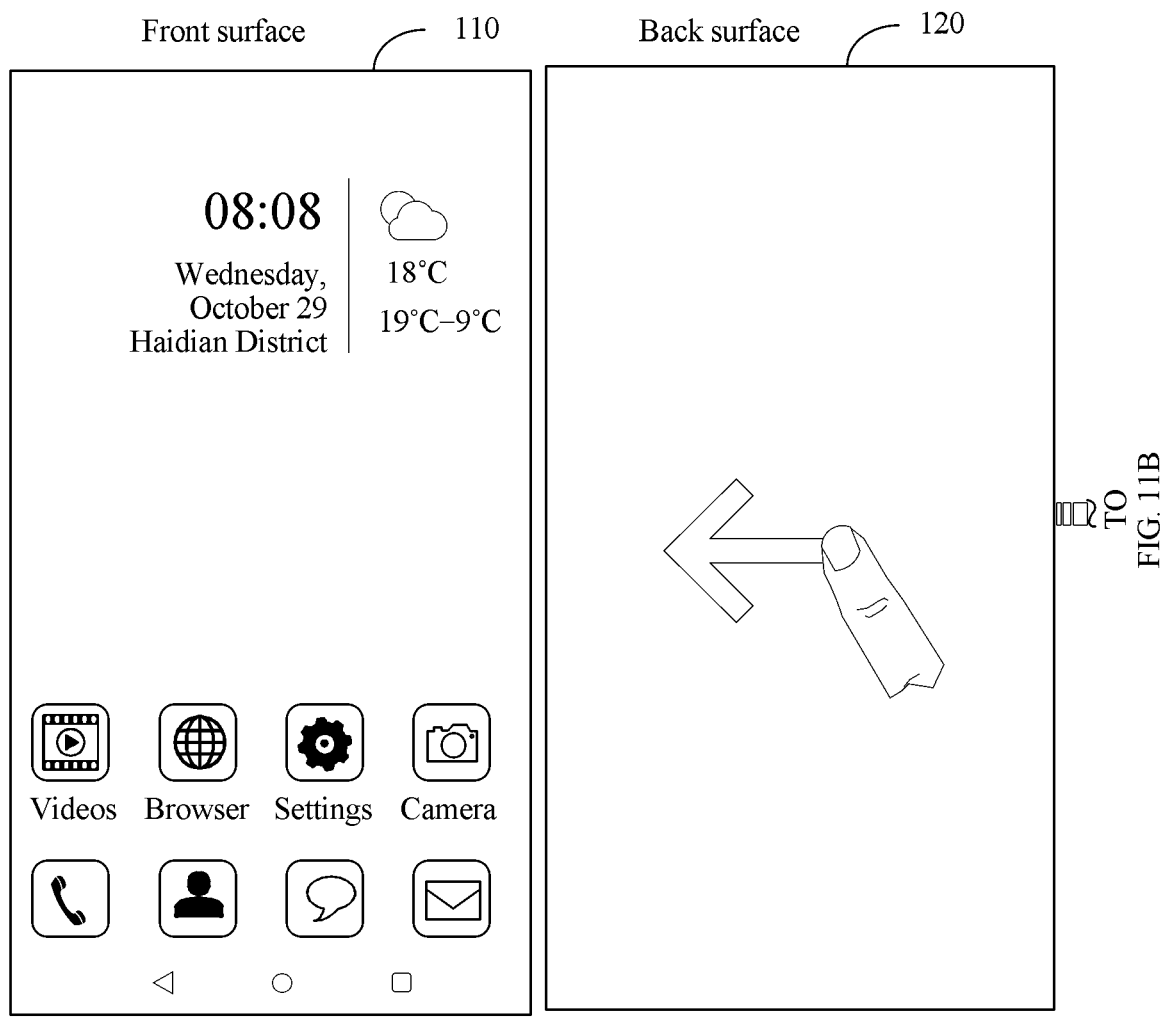
FIG. 11A and FIG. 11B are a schematic diagram of a second display solution in a second scenario according to an embodiment of the present invention.
Figure 11B:
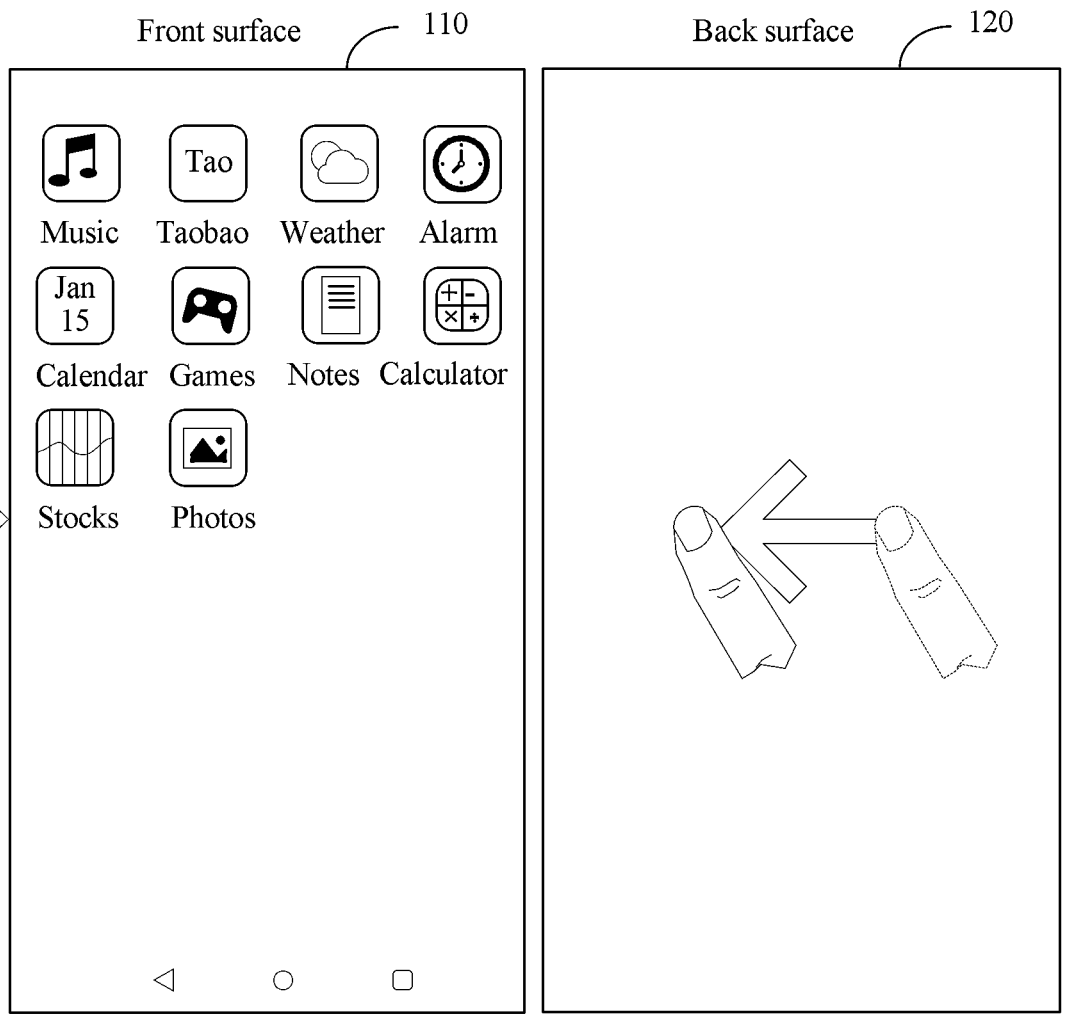

In another example, as shown in FIG. 11A, the first screen of the terminal is located on the front surface, and the second screen is located on the back surface. The terminal displays the primary icon display area on the first screen, and the second screen is in a sleep state. When the user performs an operation on the second screen, for example, sliding on the second screen, as shown in FIG. 11B, the terminal displays an icon display area adjacent to the primary icon display area on the first screen based on a sliding direction. Specifically, when the user slides to the left on the second screen, this is equivalent to sliding to the left on the first screen. Therefore, the primary icon display area displayed on the first screen is shifted to the left, and the adjacent icon display area on a right side is displayed on the first screen. A case in which the user slides to the right on the second screen is similar to this, and only a direction is opposite. Details are not described herein.

In one embodiment, the second screen may be in an on state. When the user performs a preset user operation, the terminal determines that the trigger event occurs, and may switch the display content of the two screens.

Figure 12A:
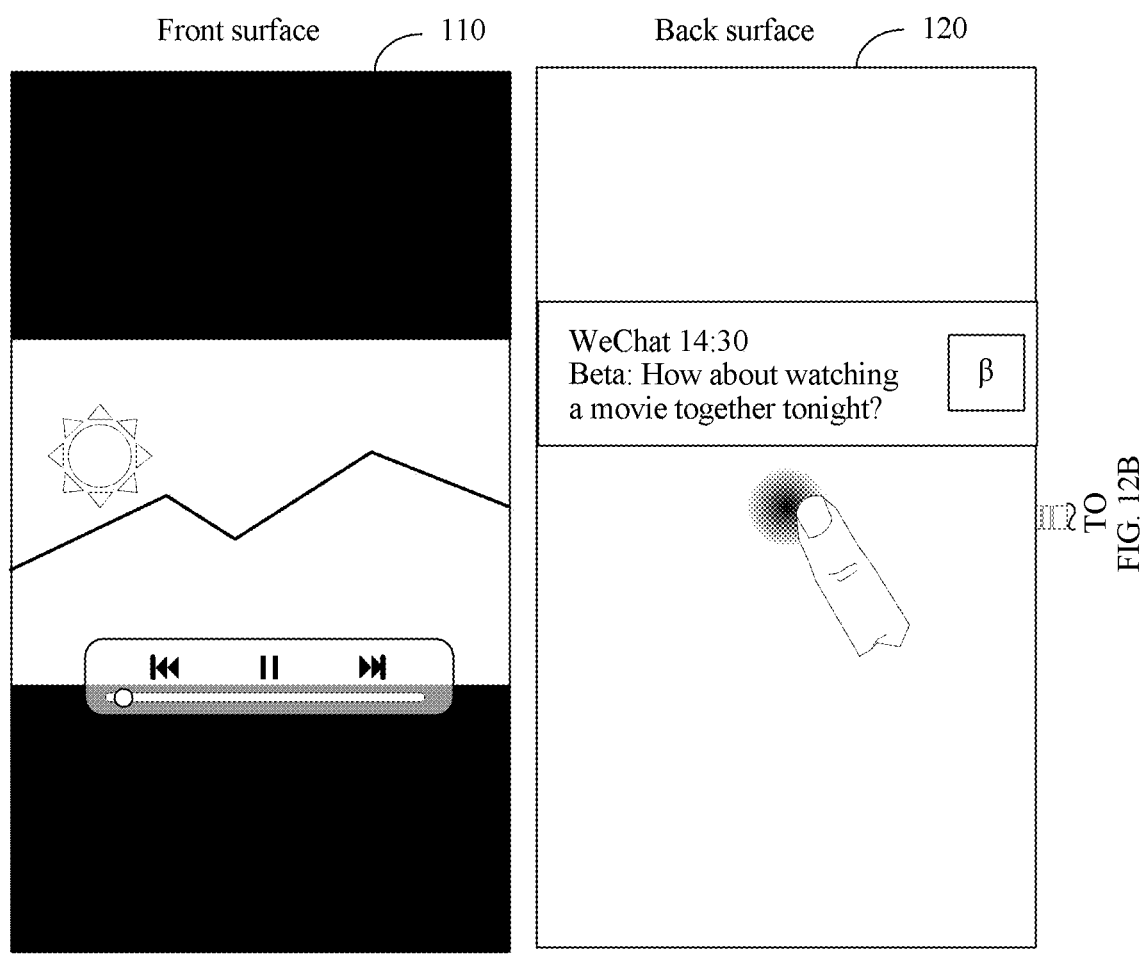
FIG. 12A and FIG. 12B are a schematic diagram of a third display solution in a second scenario according to an embodiment of the present invention.
Figure 12B:
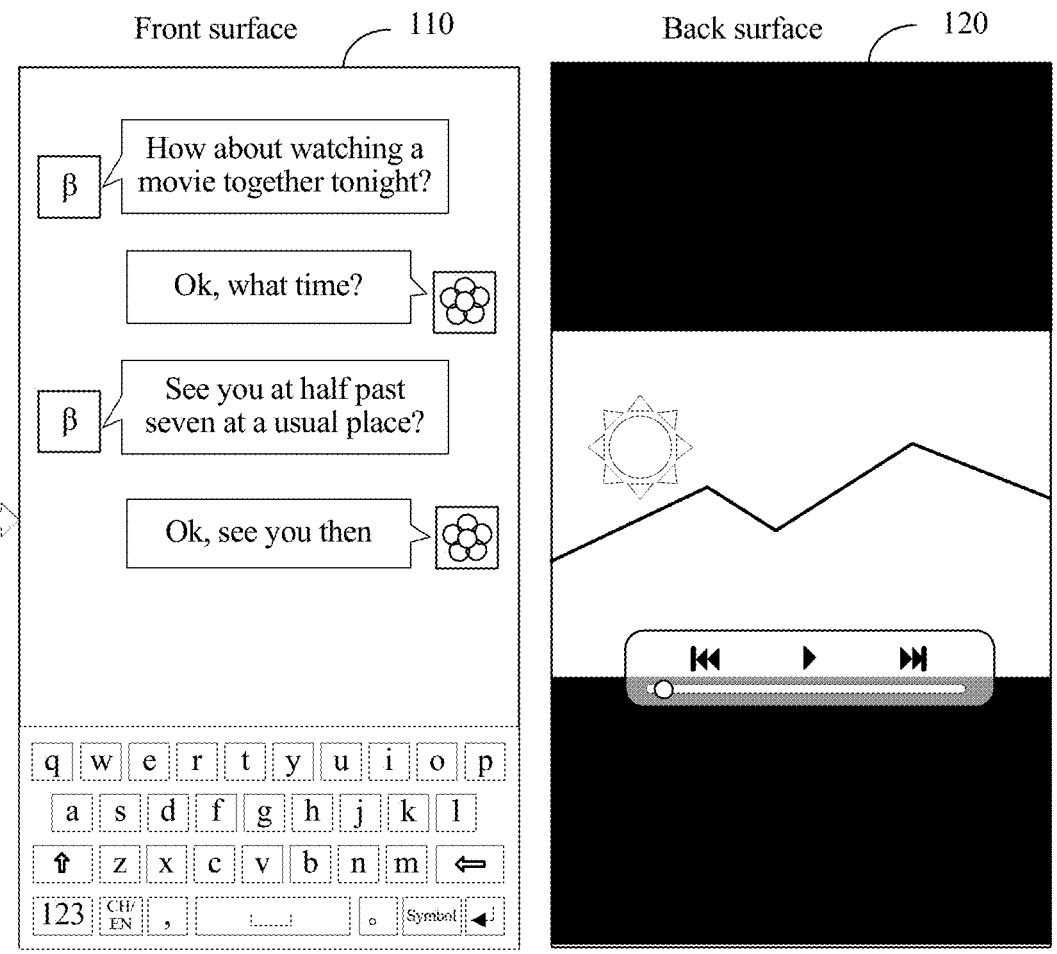

In another example, as shown in FIG. 12A, the first screen of the terminal is located on the front surface, and the second screen is located on the back surface. The terminal displays a video application interface on the first screen. When the terminal receives a new message notification, in order not to affect video watching of the user, the terminal displays the message notification on the second screen. As shown in FIG. 12B, when the user performs an operation on the second screen, for example, the user taps the second screen, the terminal displays the message application interface on the first screen based on the user operation, and displays the video application interface on the second screen.

In one embodiment, when the video application interface is displayed on the second screen, the terminal may switch the video from a play state to a pause state.

Figure 13A:
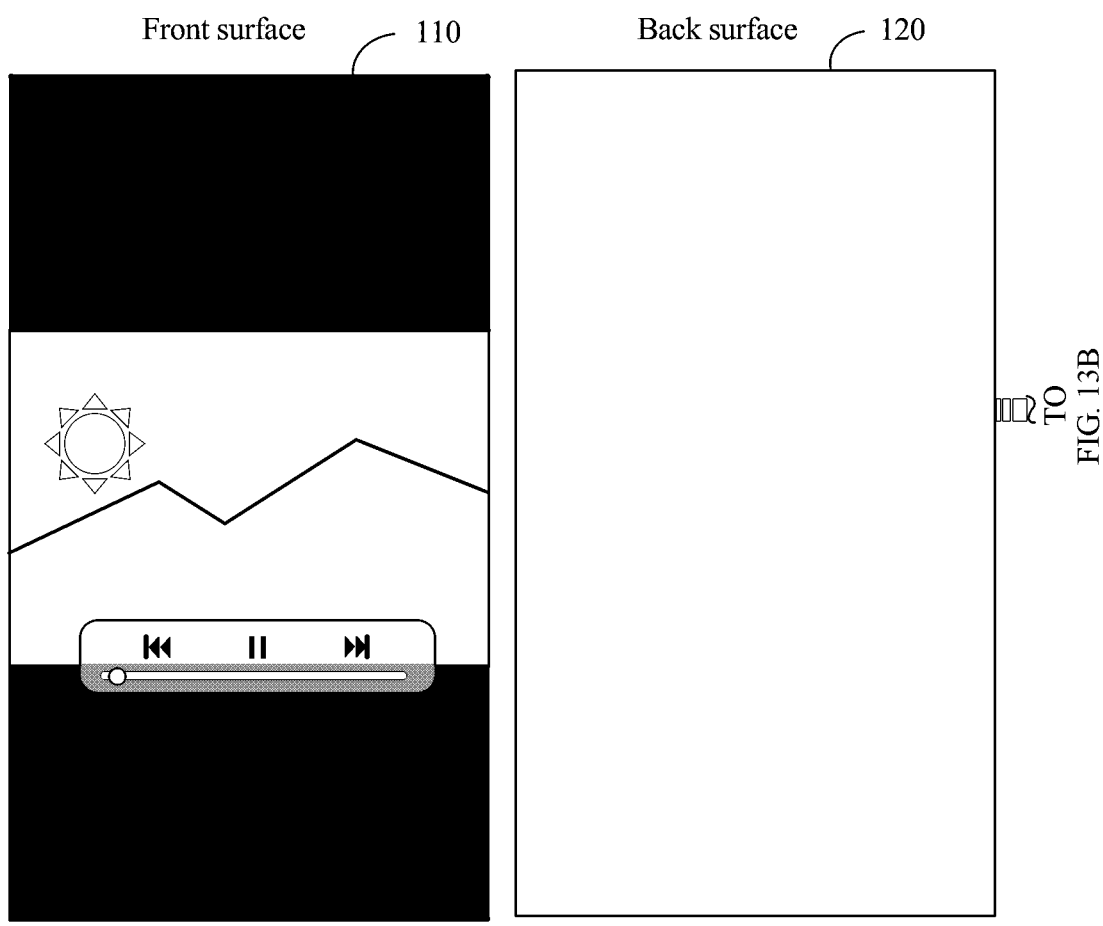
FIG. 13A and FIG. 13B are a schematic diagram of a fourth display solution in a second scenario according to an embodiment of the present invention.
Figure 13B:
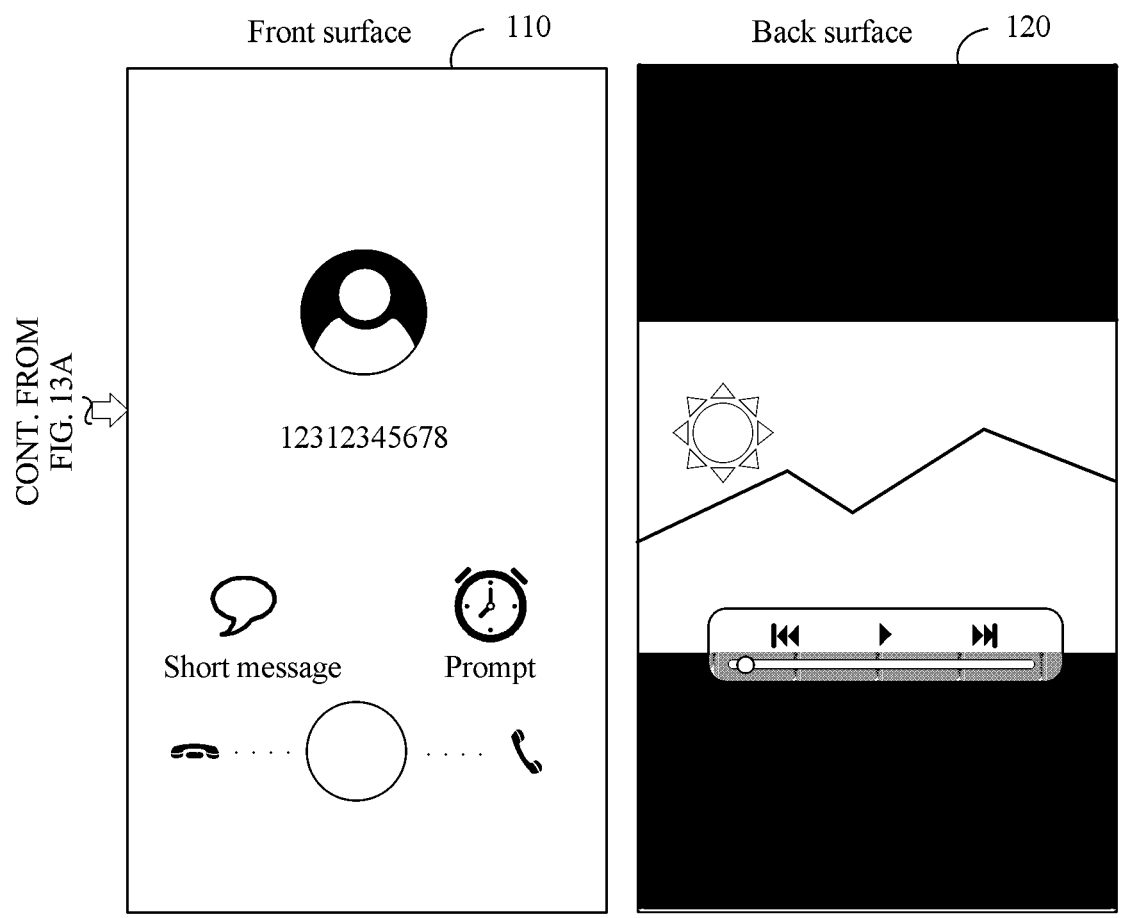

In another example, as shown in FIG. 13A, the first screen of the terminal is located on the front surface, and the second screen is located on the back surface. The terminal displays a video application interface on the first screen. When the terminal detects an application activity, for example, a mobile phone application receives an incoming call, the terminal determines that a trigger event occurs. As shown in FIG. 13B, the terminal adjusts an application layout, displays the activity application on the first screen, and displays the video application interface on the second screen. When the user completes processing the application activity, for example, disconnecting the incoming call or tapping to send a short message, the terminal restores the video application interface to an expanded interface.

In one embodiment, the terminal may adjust an application status based on an application type. For example, when an application is a video or music application, when adjusting an interface of the application, the terminal may switch the application from a play state to a pause state. When the terminal is restored to the expanded interface for display, the terminal may switch the application from the pause state to the play state.

Scenario 3

Terminal screens are switched from a second position status to a first position status. In this case, two screens of a terminal are switched from a folded state to an expanded state. In the foregoing switching process, the terminal may adjust display statuses and display content of the two screens from "suitable for the second position status" to "suitable for the first position status" based on features of the two relative position statuses.

Figure 14A:
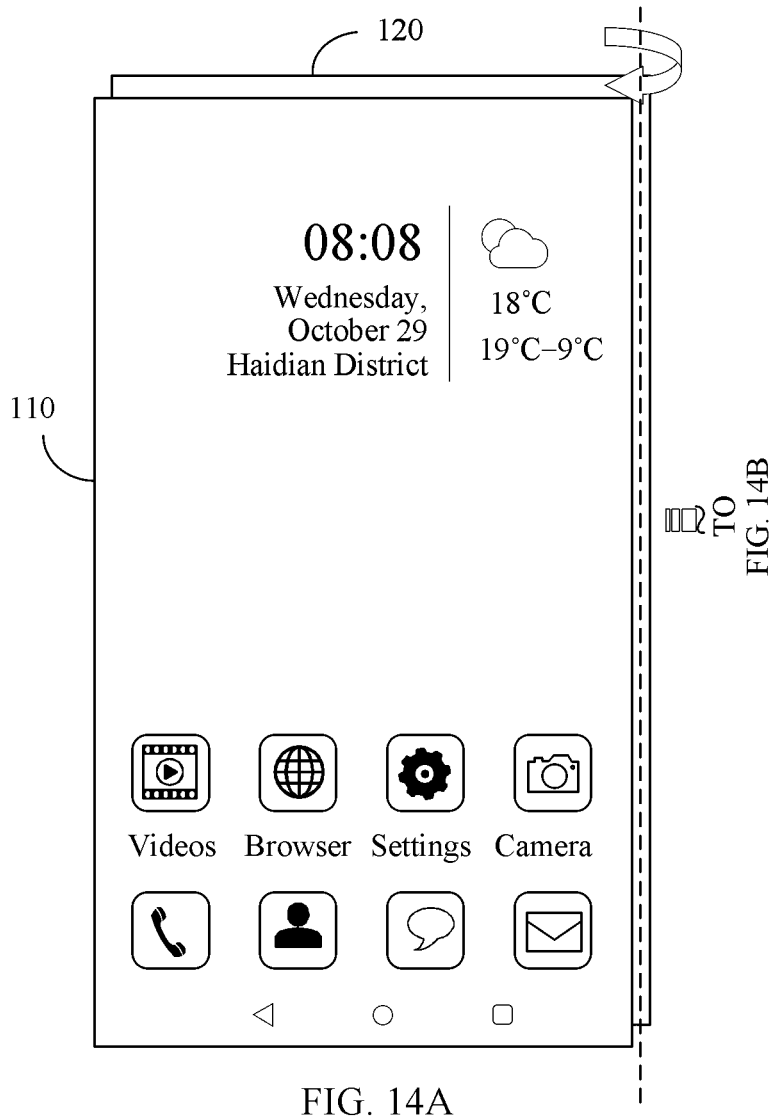
FIG. 14A and FIG. 14B are a schematic diagram of a first display solution in a third scenario according to an embodiment of the present invention.
Figure 14B:
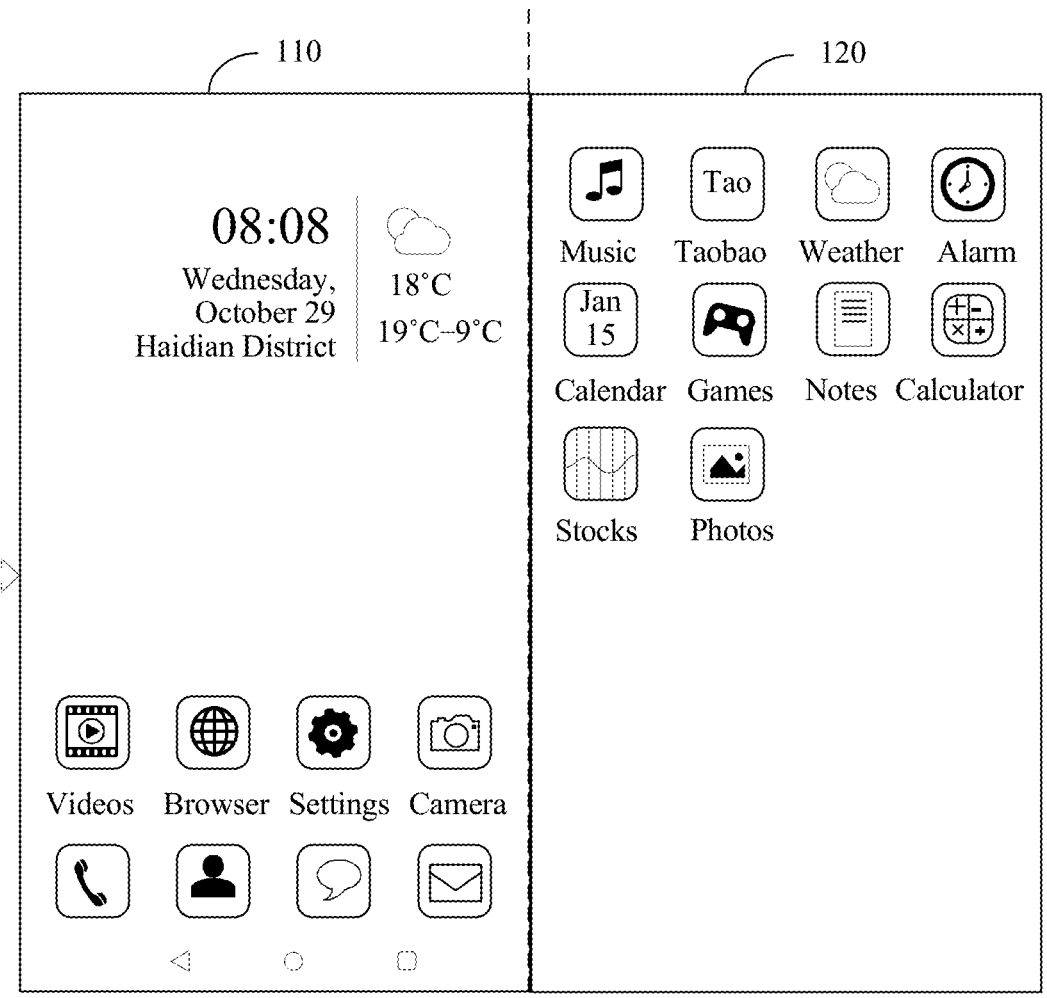

In an example, as shown in FIG. 14A, the terminal is in the second position status, and the terminal is placed in a portrait manner. The terminal displays a primary icon display area on a first screen, and the second is in a sleep state or an off state. When the second screen is rotated and expanded along a connection structure of the terminal, as shown in FIG. 14B, the terminal detects that a relative position status of screens changes, and determines that a trigger event occurs. Therefore, the terminal keeps a status of the first screen unchanged, enables the second screen, and displays an icon display area adjacent to a right side of the primary icon display area on the second screen.

In one embodiment, when the second screen is located on a left side of the first screen, the terminal may display an icon display area adjacent to a left side of the primary icon display area on the second screen.

In one embodiment, when a system desktop includes only the primary icon display area, the terminal may create a new icon display area, and display the new icon display area on the second screen. The terminal may also display HiBoard on the second screen.

In one embodiment, the first screen may display any one of a plurality of icon display areas. When the second screen is expanded, the second screen may display an icon display area adjacent to a right side or a left side of the icon display area.

Figure 15A:
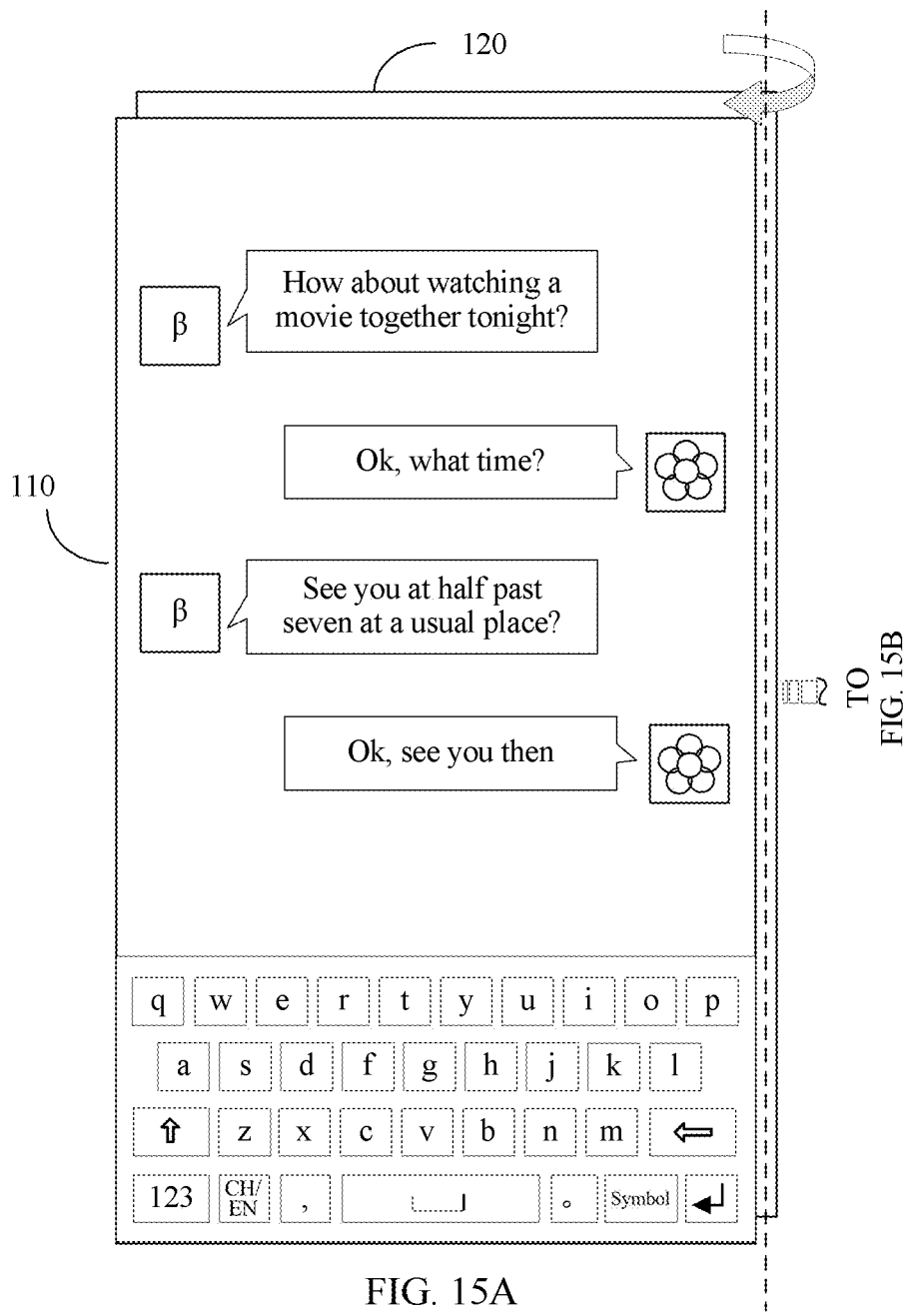
FIG. 15A and FIG. 15B are a schematic diagram of a second display solution in a third scenario according to an embodiment of the present invention.
Figure 15B:
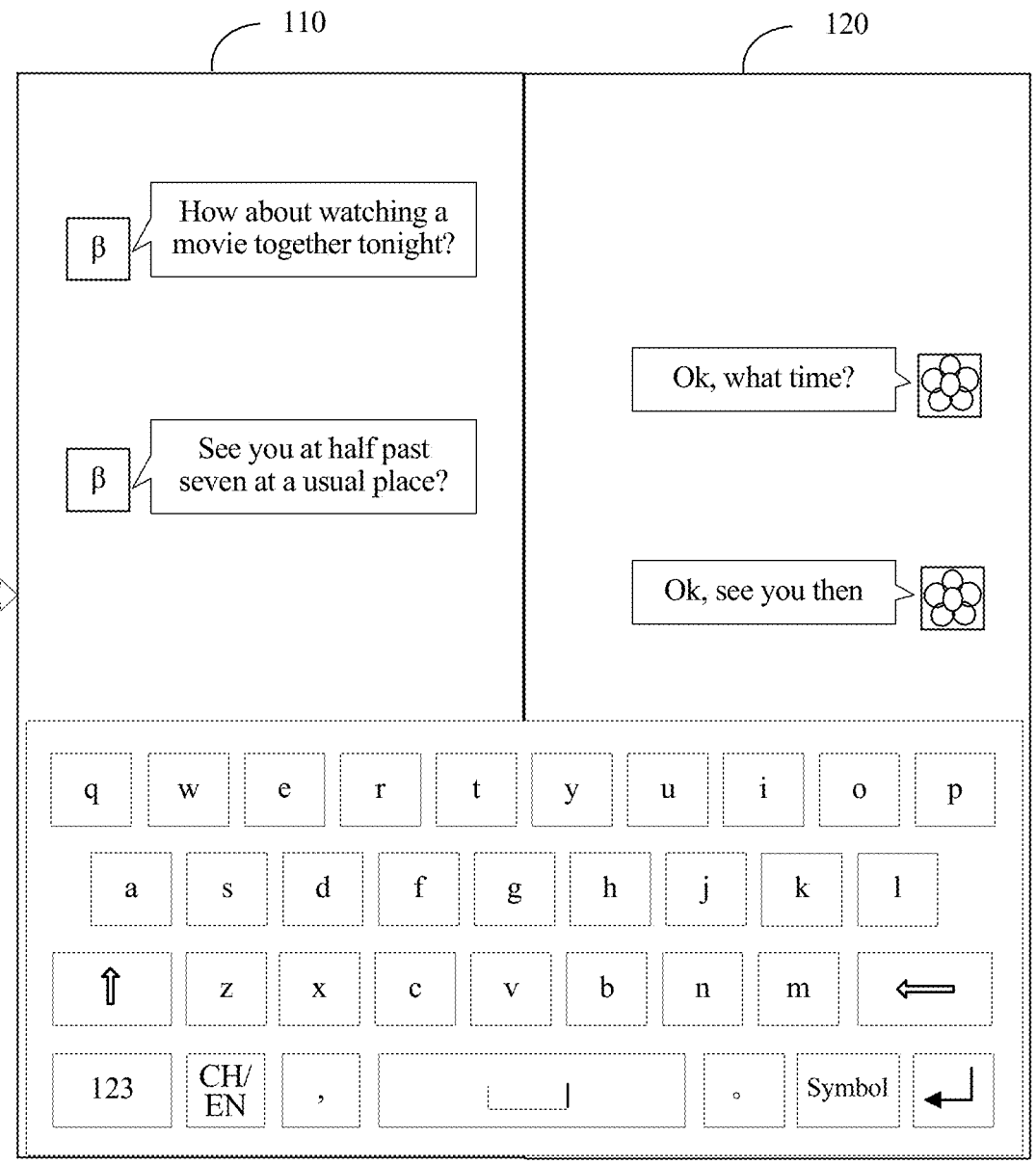

In another example, as shown in FIG. 15A, the first screen of the terminal displays a currently running application and a soft keyboard, and the application may be an instant messaging application or a document processing application. When the second screen is rotated and expanded along an axis of a screen connection structure, as shown in FIG. 15B, the terminal extends the application and the soft keyboard to the first screen and the second screen for display. By extending the application and the soft keyboard for display, a text browse area and a text input area can be expanded, and erroneous input caused by an extremely small key spacing can be reduced.

In one embodiment, the application may alternatively be another type of application, for example, an album application or a video application. When the second screen is rotated and expanded along a hinge, the terminal extends these application interfaces to the first screen and the second screen for display.

Figure 16A:
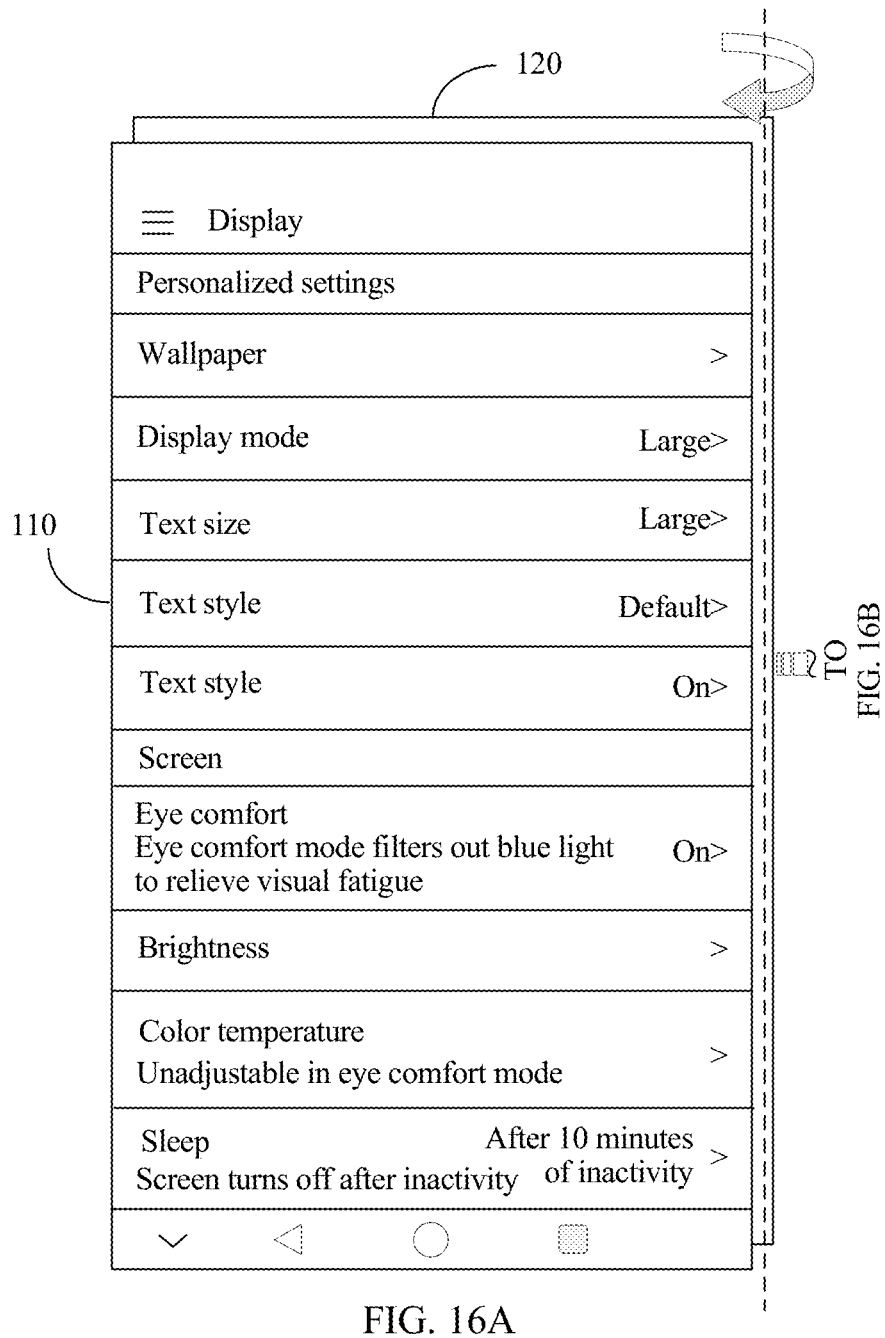

In another example, as shown in FIG. 16A, the first screen of the terminal displays a first-level menu of a currently running application, for example, a display setting menu of a system setting program. When the second screen is rotated and expanded along a hinge, as shown in FIG. 16B, the terminal keeps the first-level menu displayed on the first screen unchanged, and displays a second-level menu corresponding to the first-level menu on the second screen. By displaying the two-level menu, it may be convenient for the user to quickly browse and set a related option.

In one embodiment, when the application includes a plurality of pages, for example, an ebook reading application, the terminal displays one page of the application on the first screen. When the second screen is rotated and expanded along a hinge, the terminal keeps the display content of the first screen unchanged, and displays a next page of the page on the second screen.

Embodiment 2

Figure 17:
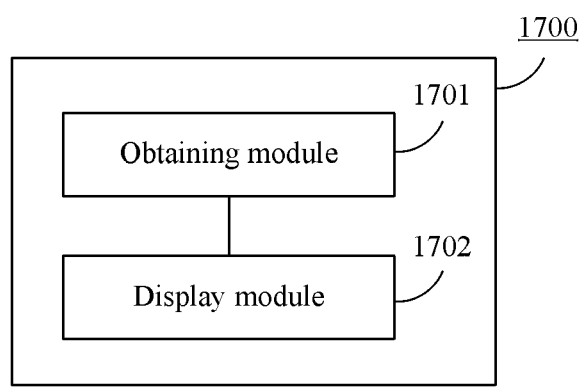
FIG. 17 is a schematic structural diagram of a second terminal according to an embodiment of the present invention.

FIG. 17 is a schematic structural diagram of a second terminal according to an embodiment of the present invention. The terminal provided in this embodiment of the present invention may be configured to perform the methods implemented in the embodiments of the present invention shown in FIG. 4 to FIG. 16A and FIG. 16B. As shown in FIG. 17, the terminal 1700 includes an obtaining module 1701 and a display module 1702.

The obtaining module 1701 is configured to obtain orientations and display statuses of a first screen and a second screen of the terminal. The display module 1702 is configured to: when a trigger event occurs, display adjusted display content on the first screen and the second screen based on the orientations and the display statuses of the first screen and the second screen, where the trigger event is used to trigger the terminal to adjust the display statuses of the first screen and the second screen.

In one embodiment, the obtaining module 1701 is further configured to obtain a relative position status of the first screen and the second screen.

In one embodiment, the obtaining module 1701 is further configured to obtain the relative position status by using sensors disposed on the first screen and the second screen.

In this embodiment of the present invention, the terminal obtains an orientation, a display status, and display content of a screen. When determining that the trigger event occurs, the terminal may adjust the display status of the screen in a timely manner, so that a user can perform an interaction operation and interaction display between different screens, thereby improving user experience.

Embodiment 3

Figure 18:
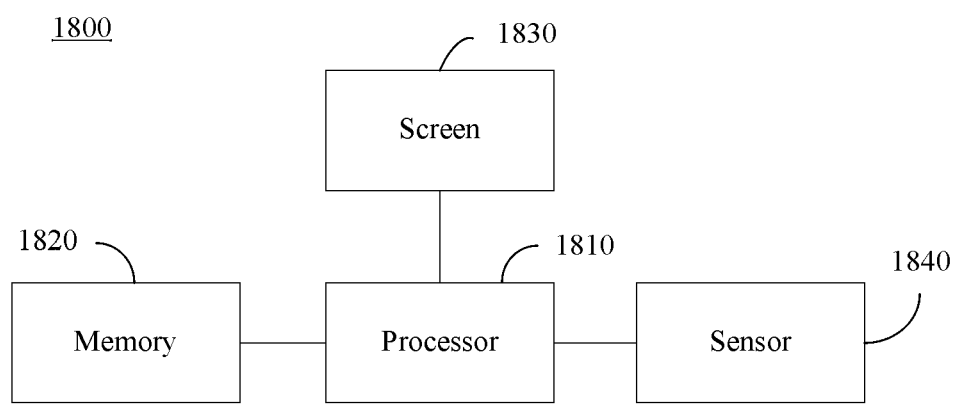
FIG. 18 is a schematic structural diagram of a third terminal according to an embodiment of the present invention.

FIG. 18 is a schematic structural diagram of a third terminal according to an embodiment of the present invention. The terminal provided in this embodiment of the present invention may be configured to perform the methods implemented in the embodiments of the present invention shown in FIG. 4 to FIG. 16A and FIG. 16B. For ease of description, only a part related to this embodiment of the present invention is shown. For specific technical details that are not disclosed, refer to the foregoing method embodiments of the present invention and another part of this application document. As shown in FIG. 18, the terminal 1800 includes a processor 1810, a memory 1820, a screen 1830, and a sensor 1840.

The processor 1810 is connected to the memory 1820, the display screen 1830, and the sensor 1840 by using one or more buses, and is configured to obtain information collected by a sensor 1850, invoke an execution instruction stored in the memory 1820, and send the execution instruction stored in the memory 1820 to the display screen 1830 for presentation. The processor 1810 may be the processor 180 shown in FIG. 1.

The memory 1820 may be the memory 120 shown in FIG. 1, or some components in the memory 120.

The screen 1830 includes at least a first screen and a second screen. The display screen 1830 may be the display screen 140 shown in FIG. 1 or another external display device.

The sensor 1840 may be the sensor 150 shown in FIG. 1.

The processor 1810 is configured to: obtain orientations and display statuses of the first screen and the second screen; and when a trigger event occurs, display adjusted display content on the first screen and the second screen based on the orientations and the display statuses of the first screen and the second screen, where the trigger event is used to trigger the terminal to adjust the display statuses of the first screen and the second screen.

Further, the processor 1810 is further configured to obtain a relative position status of the first screen and the second screen.

Further, the processor 1810 is further configured to obtain the relative position status by using sensors disposed on the first screen and the second screen.

In this embodiment of the present invention, the terminal obtains an orientation, a display status, and display content of a screen. When determining that the trigger event occurs, the terminal may adjust the display status of the screen in a timely manner, so that a user can perform an interaction operation and interaction display between different screens, thereby improving user experience.

All or some of the foregoing embodiments in the present invention may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, all or some of the procedures or functions according to the embodiments of the present invention are generated. The computer may be a general-purpose computer, a dedicated computer, a computer network, or another programmable apparatus. The computer instructions may be stored in a computer-readable storage medium or may be transmitted from a computer-readable medium to another computer-readable medium. For example, the computer instructions may be transmitted from a web site, computer, server, or data center to another web site, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD), or the like.

A person skilled in the art should be aware that in one or more of the foregoing examples, the functions described in the present invention may be implemented by using hardware, software, firmware, or any combination thereof. When being implemented by software, these functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a general or dedicated computer.

In the foregoing specific implementations, the objectives, technical solutions, and beneficial effects of the present invention are further described in detail. It may be understood by a person skilled in the art that the foregoing descriptions are merely preferred embodiments of the technical solutions of the present invention, but are not intended to limit the protection scope of the present invention. Any modification, equivalent replacement, or improvement made without departing from the spirit and principle of the present invention shall fall within the protection scope of the present invention.

What is claimed is:

1. A display control method, comprising:
   displaying, by a foldable mobile phone comprising a first screen and a second screen, a first-level menu of a currently-running application on the first screen;
   detecting, by the foldable mobile phone, the second screen being rotated along a hinge which connects the first and second screens to expand the foldable mobile phone's display; and
   in response to the second screen being rotated along the hinge, displaying a second-level menu on the second screen, wherein the second-level menu corresponds to the first-level menu.

2. The method of claim 1, wherein an included angle between the first screen and the second screen is configured to be adjustable within a range from 0° to 360°.

3. The method of claim 1, wherein the method further comprises:
   displaying, by the foldable mobile phone while the foldable mobile phone is in a portrait orientation, a first application on a top portion of the first and second screens, and a text input area or a soft keyboard display on a bottom portion of the first and second screens.

4. The method of claim 3, wherein while the foldable mobile phone is in the portrait orientation, the first screen is to the left of the second screen.

5. The method of claim 3, wherein the method further comprises:
   displaying, by the foldable mobile phone while the foldable mobile phone is in a landscape orientation, the first application on the first screen and the text input area or the soft keyboard display on the second screen.

6. The method of claim 5, wherein while the foldable mobile phone is in the landscape orientation, the first screen is above the second screen.

7. The method of claim 1, wherein the second-level menu is displayed on the second screen together with the first-level menu being displayed on the first screen.

8. The method of claim 1, wherein the currently-running application is a system setting program, and the first-level menu is a display setting menu.

9. The method of claim 1, wherein the second-level menu corresponds to an item in the first-level menu being selected.

10. A foldable mobile phone, comprising:
    a first screen;
    a second screen; and
    a processor configured to:
    cause a first-level menu of a currently-running application to be displayed on the first screen;
    detect the second screen being rotated along a hinge which connects the first and second screens, expanding the foldable mobile phone's display; and
    cause, in response to the second screen being rotated along the hinge, a second-level menu to be displayed on the second screen, wherein the second-level menu corresponds to the first-level menu.

11. The foldable mobile phone of claim 10, wherein an included angle between the first screen and the second screen is configured to be adjustable within a range from 0° to 360°.

12. The foldable mobile phone of claim 10, wherein the processor is further configured to cause, while the foldable mobile phone is in a portrait orientation, a first application to be displayed on a top portion of the first and second screens, and a text input area or a soft keyboard display to be displayed on a bottom portion of the first and second screens.

13. The foldable mobile phone of claim 12, wherein while the foldable mobile phone is in the portrait orientation, the first screen is to the left of the second screen.

14. The foldable mobile phone of claim 12, wherein the processor is further configured to cause, while the foldable mobile phone is in a landscape orientation, the first application to be displayed on the first screen and the text input area or the soft keyboard display to be displayed on the second screen.

15. The foldable mobile phone of claim 14, wherein while the foldable mobile phone is in the landscape orientation, the first screen is above the second screen.

16. The foldable mobile phone of claim 10, wherein the second-level menu is displayed on the second screen together with the first-level menu being displayed on the first screen.

17. The foldable mobile phone of claim 10, wherein the currently-running application is a system setting program, and the first-level menu is a display setting menu.

18. The foldable mobile phone of claim 10, wherein the second-level menu corresponds to an item in the first-level menu being selected.

* * * * *